(12) United States Patent
Hind et al.

(10) Patent No.: US 6,938,204 B1
(45) Date of Patent: Aug. 30, 2005

(54) ARRAY-BASED EXTENSIBLE DOCUMENT STORAGE FORMAT

(75) Inventors: John R. Hind, Raleigh, NC (US); Yongcheng Li, Raleigh, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 09/652,296

(22) Filed: Aug. 31, 2000

(51) Int. Cl.[7] .............................. G06F 3/00; G06F 9/00; G06F 17/00

(52) U.S. Cl. ...................... 715/515; 715/513; 707/101; 707/102

(58) Field of Search ................................. 715/515, 513; 707/101, 102

(56) References Cited

U.S. PATENT DOCUMENTS

| | | | | |
|---|---|---|---|---|
| 5,179,378 | A | * | 1/1993 | Ranganathan et al. ........ 341/51 |
| 5,663,721 | A | * | 9/1997 | Rossi ........................... 341/51 |
| 6,209,124 | B1 | * | 3/2001 | Vermeire et al. ........... 717/114 |
| 6,330,574 | B1 | * | 12/2001 | Murashita ................... 715/513 |
| 6,430,624 | B1 | * | 8/2002 | Jamtgaard et al. .......... 709/246 |
| 6,446,256 | B1 | * | 9/2002 | Hyman et al. .............. 717/143 |
| 6,490,591 | B1 | * | 12/2002 | Denbar et al. .............. 707/101 |
| 6,502,101 | B1 | * | 12/2002 | Verprauskus et al. ....... 707/101 |
| 6,504,554 | B1 | * | 1/2003 | Stone et al. ................. 345/760 |
| 6,593,944 | B1 | * | 7/2003 | Nicolas et al. .............. 345/744 |
| 6,675,351 | B1 | * | 1/2004 | Leduc ......................... 715/503 |
| 6,697,805 | B1 | * | 2/2004 | Choquier et al. ............. 707/10 |

OTHER PUBLICATIONS

The Apache Software Foundation, Xalan–Java Version 1.2.D01, Jul. 25, 2000.*

Jang, Hyunchul et al., An Effective Mechanism for Index Update in Structured Documents, Nov. 1999.*

Yamamoto, Yohei et al., On Indices for XML Documents with Namespaces, 1999.*

"SML: Simplifying XML", by Robert E. La Quey, pp. 1–5, published on XML.com Nov. 24, 1999, http://www.xml-.com/print/ 1999/11/sml/ndex.html.

* cited by examiner

Primary Examiner—Joseph Feild
Assistant Examiner—N Hillery
(74) Attorney, Agent, or Firm—Myers, Bigel, Sibley & Sajovec, P.A.

(57) ABSTRACT

Systems and computer program products are provided having a plurality of arrays used to represent structured documents. The arrays include an element name array including an element name entry for each element in the structure document, an element value array including an element value entry for each element in the structured document, an attribute array including an attribute entry for each element in the structured document, a parent array including a parent entry for each element in the structured document and a child array including a child entry for each element in the structured document, The value of each parent entry identifies a parent of the element and the value of each child entry identifies zero or more children of the element.

18 Claims, 16 Drawing Sheets

FIG. 1
(PRIOR ART)

```
<NAMES>
    <NAME>
        <LAST_NAME> 105
        Erwin
        </LAST_NAME> 110
        <FIRST_NAME> 115
        Cody  120
        </FIRST_NAME> 125
        <MIDDLE_INITIAL />
    </NAME>
    <NAME>
        <LAST_NAME SUFFIX = "Jr."> 130
                              135
        Curtis
        </LAST_NAME>
        <FIRST_NAME>
        John
        </FIRST_NAME>
        <MIDDLE_INITIAL />
    </NAME>
</NAMES>
```

```
<root_element> 402
  <level_one_element1 id="1" name="1"> 410
    A
    <level_two_element11> B </level_two_element11> 412
    <level_two_element12> C </level_two_element12> 414
  </level_one_element1>
  <level_one_element2 id="2" name="2"> 420
    D
    <level_two_element21> E </level_two_element21> 422
  </level_one_element2>
</root_element>
```

470 → 6(root_element;1,4;;;)(level_one_element1;2,3;0,2,2,1,3,4,7,1;8,1)
(level_two_element11;;;9,1)(level_two_element12;;;10,1)
(level_one_element2;5;11,2,13,1,14,4,18,1;19,1)
(level_two_element21;;;20,1)id1name1ABCid2name2DE ← 480

|  | 0 ₅₀₅ | 1 ₅₀₆ | 2 | 3 ₅₀₇ | 4 ₅₀₈ | 5 |
|---|---|---|---|---|---|---|
| ⁵⁰¹start pointer | 2 | 22 | 66 | 93 | 121 | 168 |
| ⁵⁰²length | 12 | 18 | 19 | 19 | 18 | 19 |
| ⁵⁰³buffer pointer | B | B | B | B | B | B |

B → points to the mXML buffer

|  | 0 ₅₁₅ | 1 | 2 | 3 ₅₁₆ | 4 | 5 |
|---|---|---|---|---|---|---|
| ⁵¹¹start pointer | -1 | 8 | 9 | 10 | 19 | 20 |
| ⁵¹²length | -1 | 1 | 1 | 1 | 1 | 1 |
| ⁵¹³buffer pointer | DB | DB | DB | DB | DB | DB |

DB → points to the mXML data buffer

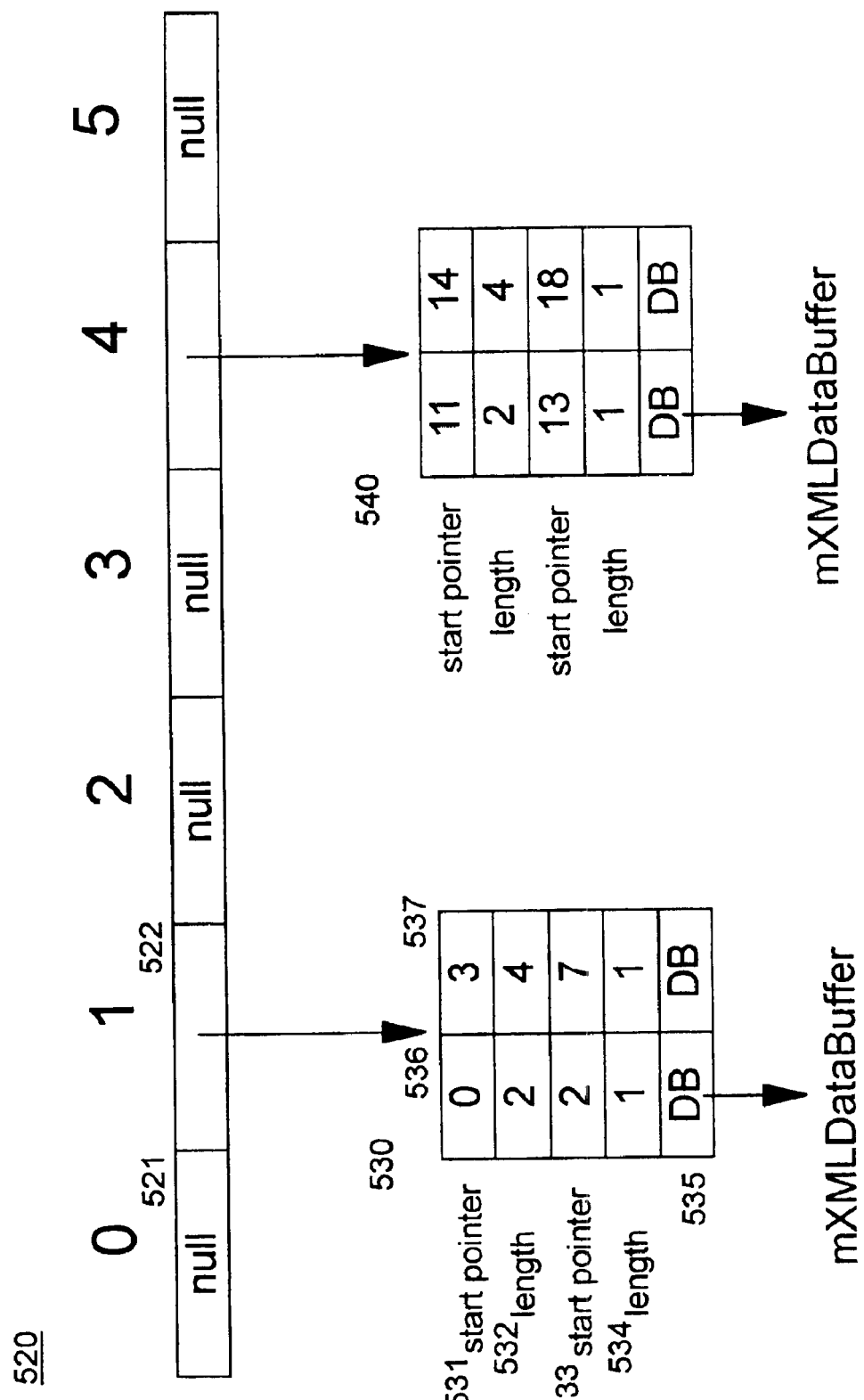

ARRAY-BASED EXTENSIBLE DOCUMENT STORAGE FORMAT

RELATED INVENTION

The present invention is related to pending U.S. Patent Application, titled "Machine-Oriented Extensible Document Representation and Interchange Notation" (Ser. No. 09/652,056), referred to herein as: the "first related invention", and pending U.S. Patent Application titled "High Performance Extensible Document Transformation" (Ser. No. 09/653,080), referred to herein as the "second related invention", both of which were filed concurrently herewith. These related inventions are commonly assigned to International Business Machines Corporation (IBM), and are hereby incorporated herein by reference.

BACKGROUND OF THE INVENTION

1. Field of the Invention

The present invention relates to a computer system, and deals more particularly with an array-based extensible document storage format, as well as a method, system, and computer program product for operating upon (e.g. creating, and retrieving information from) the arrays. The arrays may be used for storing Extensible Markup Language (XML) documents, or documents encoded in other notations such as the machine-oriented extensible markup language (mXML) disclosed in the first related invention, providing for more efficient document storage and document processing than are available in the prior art.

2. Description of the Related Art

Business and consumer use of distributed computing, also commonly referred to as network computing, has gained tremendous popularity in recent years. In computing model, the data and/or programs to be used to perform a particular computing task typically reside on (i.e. are "distributed" among) more than one computer, where these multiple computers are connected by a network of some type. The Internet, and the part of the Internet known as the World Wide Web (hereinafter, "Web"), are well-known examples of this type of environment wherein the multicomputers are connected using a public network. Other types of network environments in which distributed computing may be used include intranets, which are typically private networks accessible to a restricted set of users (such as employees of a corporation), and extranets (e.g., a corporate network which is accessible to other users than just the employees of the company which owns and/or manages the network, such as the company's business partners).

The Extensible Markup Language ("XML") is becoming the de facto standard format for representing and exchanging information in these environments. XML is a tag language, which is a language that uses specially-designated constructs referred to as "tags" to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags in XML, the syntax "<email>" could be used as a tag to indicate that the character string appearing in the data stream after this tag is to be treated as an e-mail address, the syntax "</email>" would then be inserted after the character string, to delimit where the e-mail character string ends.

The syntax of XML is extensible and flexible, and allows document developers to create tap to convey an explicit nested tree document structure (where the structure is determined from the relationship among the tags in a particular document). Furthermore, document developers can define their own tags which may have application-specific semantics. Because of this extensibility, XML documents may be used to specify many different types of information, for use in a virtually unlimited number of contexts. It is this extensibility and flexibility which is, in large part, responsible for the popularity of XML. (A number of XML derivative notions have been defined, and continue to be defined, for particular purposes. "VoiceXML" is an example of one such derivative. References herein to "XML" are intended to include XML derivatives and semantically similar notations such as derivatives of the Standard Generalized Markup Language, or "SGML", from which XML was derived. Refer to ISO 8879, "Standard Generalized Markup Language (SGML)", (1986) for more information on SGML, Refer to "Extensible Markup Language (XML), W3C Recommendation 10-Feb. -1998" which is available from the World Wide Web Consortium, or "W3C", for more information on XML.)

Although XML is an excellent data format, the parsing, manipulation, and transformation of XML documents involves a considerable amount of overhead. FIG. 1 provides a simple example of prior-art XML syntax for a document 100 that may be used for specifying names (for example, names of the employees of a corporation, the customers of a business, etc.). In this example, a <LAST_NAME> tag pair 105, 110 is used to represent information for a last name, and a <FIRST_NAME> tag pair 115, 120 is used to represent information for a first name. The data content value for the last name and first name then appears (as a string, in this case) between the opening and closing tags. The <MIDDLE_INITIAL/> tag 125 in this case uses a short-hand empty tag format where the tag name of a tag having no data content is followed by a closing tag symbol "/>". XML tags may also contain attribute names and attribute values, as shown by the 'SUFFIX="Jr."' attribute 135 specified within the opening <LAST_NAME> tag 130. As can be seen upon inspection of this document 100, the entire data content of this example comprises 22 characters. The tag syntax, however, adds another 201 printable characters (not including tabs, line returns, blanks, etc.), or approximately 90 percent of the total document file size. In the general case, the overhead in terms of characters used for the tag syntax could be even higher, as the tag names might be even longer than those shown. In addition, the data content specified in this example as an attribute (shown at 135) could alternatively be represented as an element within its own opening and closing tag pair, leading to an even greater amount of tag-related overhead.

The extensible tag syntax enables an XML document to be easily human-readable, as the tag names can be designed to convey the semantic meaning of the associated data values and the overall relationship among the elements of the data. For example, in FIG. 1 the tag names and structure explicitly show that a name includes a last name, a first name, and a middle initial. This human-friendly, well-structured format enables a human being to quickly look through an arbitrary XML document and understand the data and its meaning. However, it will take a computer quite a lot of effort to understand the data and do useful things with it.

The raw content of most XML documents will never be seen by a human: instead, what the end user sees is typically created using a rendering application (such as an XML parser within a browser) which strips out the tags and displays only the embedded data content. The added overhead of the human-friendly tag syntax therefore leads to unnecessary inefficiencies in processing and storing structured documents when the documents will only be "seen" by a computer program, such as for those documents which are formatted for interchange between computer programs for business-to-business ("B2B") or business-to-consumer ("B2C") use. This is especially true when the XML document is destined for processing on a high-volume transaction server, where none of the processing steps is likely to require a human to see or understand the document tags. (The terms "extensible document" and "structured document" are used interchangeably herein unless otherwise stated.)

Furthermore, prior art techniques for storing XML documents and processing those documents require a considerable amount of processing and storage overhead. Typically, an XML document is parsed and stored internally as a Document Object Model (DOM) tree representation by an XML parser. DOM trees are physically stored in a tree representation, using objects to represent the nodes in the tree, the attributes of the nodes, the values of the nodes, etc. Operations are then performed (e.g. by content renderers or style sheet processors) then operate upon this tree representation. For example, deleting elements from a document may be accomplished by pruning subtrees from the DOM tree; renaming elements within a document may be accomplished by traversing the DOM tree to find the occurrences of the element name, and substituting the new name into the appropriate nodes of the DOM tree. (DOM is published as a Recommendation of the W3C, titled "Document Object Model (DOM) Level 1 Specification, Version 1.0" (1998).

Creation of a DOM tree is computationally expensive in terms of processing time and memory requirements. Using this tree-oriented DOM representation as an internal storage format requires a considerable amount of memory and/or storage space to store the required objects. In addition, a number of computer program instructions must be executed to allocate memory and create the objects, delete objects and de-allocate memory, and traverse the tree structure to perform operations thereon. Execution of these instructions increases the processing time required for structured documents, as do the operating system-invoked instructions which are periodically executed to perform garbage collection (whereby the space being used by objects can be reclaimed after the objects have been logically deleted or de-allocated).

The Xalan XSLT (Extensible Language Transformations) processor from the Apache Software Foundation reduces the number of objects used by DOM processors somewhat by providing an in-memory Document Table Model ("DTM") representation of a DOM tree. An array is used instead of a set of "real objects" for storing the DOM tree itself. However, there are still many objects around to represent the XML data content of a document (including objects for the nodes, node values, attributes, attribute values, etc.).

With the growing prevalence of structured documents in the B2B and B2C environments, and the increasing use of structured documents as the input and output transaction format for high-volume transaction servers, it is necessary to avoid memory, storage, and processing inefficiencies to the greatest extent possible.

Accordingly, what is needed is an improved storage format for extensible documents that will enable improving the processing time and memory or storage requirements for arbitrarily-structured documents while still providing equivalent content and structural information. Techniques for storing documents originally created in XML using this improved storage format are preferably provided to enable prior art XML documents to be processed more efficiently.

SUMMARY OF THE INVENTION

An object of the present invention is to provide an improved storage format for extensible documents, where use of this improved storage format will enable improving the processing time and memory or storage requirements for arbitrarily-structured documents while still providing equivalent content and structural information.

It is another object of the present invention to provide this improved storage format using arrays.

Another object of the present invention is to provide a technique for storing documents created in XML using this improved storage format, in order to enable prior art XML documents to be processed more efficiently.

Yet another object of the present invention is to provide a technique for storing documents created in mXML using this improved storage format, in order to enable documents created in the mXML notation to be processed more efficiently.

Still another object of the present invention is to provide a technique for externalizing the array-based storage format, which enables minimized parsing overhead.

It is also an object of the present invention to provide an array-based extensible document storage format which can be used to improve the processing speed and to reduce the processing overhead, memory operations, and/or storage requirements associated with using structured notations such as XML.

A further object of the present invention to provide an array-based extensible document storage format which can be used to optimize the processing speed, processing overhead, storage requirements, and/or memory operations for operating upon documents represented in the mXML notation.

Still another object of the present invention is to provide a storage format which has better performance characteristics (including processing speed, processing overhead, memory operations, and/or storage requirements) as compared to existing DOM tree storage representations of the prior art.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides an array-based extensible document storage format, as well as a method, system, and computer program product for operating upon (e.g. creating, and retrieving information from) the arrays. The arrays may be used for storing Extensible Markup Language (XML) documents, or documents encoded in other notations such as mXML, providing for more efficient document storage and document processing than are available in the prior art. In the preferred embodiment, a plurality of arrays are used for representing each structured document, comprising: an element name array, the element name array comprising an element name entry for each element in the structured document; an element value array, the element value array comprising an element value entry for each element in the structured document; optionally, an attribute array, the attribute array comprising an attribute entry for each element in the structured document; a parent array, the parent array comprising a parent entry for each element in the structured document and wherein a value of each parent entry identifies a parent of the element; and a child array, the child array comprising a child entry for each element in the structured document and wherein a value of each child entry identifies zero or more children of the element.

In one aspect, each element name entry specifies a starting name position and a name length, where the starting name position is relative to a beginning of a storage buffer wherein a name of each of the elements is stored. In another aspect, each element name entry specifies a starting name position and an ending name position, where the starting and ending name positions are relative to a beginning of the storage buffer.

In one aspect, each element value entry specifies a starting value position and a value length, where the starting value position is relative to a beginning of a storage buffer wherein a value of each of the elements is stored. In another aspect, each element value entry specifies a starting value position and an ending value position, where the starting and ending value positions are relative to a beginning of the storage buffer.

Each attribute entry preferably specifies a reference to a secondary array, wherein the secondary array comprises a secondary attribute entry for each of one or more attributes of those ones of the elements which have attributes, and a null value otherwise. In one aspect, each secondary attribute entry specifies a starting name position and a length for a name of the attribute, and a starting value position and a length for a value of the attribute. In another aspect, each secondary attribute entry specifies a starting name position and an ending name position for a name of the attribute, and a starting value position and an ending value position for a value of the attribute.

The present invention also provides a technique for representing a source document encoded in an extensible structured notation musing a plurality of arrays. This comprises: generating an element name array, the element name array comprising an element name entry for each element in the source document wherein each element name entry specifies a starting name position and one of (1) a name length or (2) an ending name position; generating an element value array, the element value array comprising an element value entry for each element in the source document, wherein each element value entry specifies a starting value position and one of (1) a value length or (2) an ending value position; generating a parent array, the parent array comprising a parent entry for each element in the source document and wherein a value of each parent entry identifies a parent of the element, generating a child array, the child array comprising a child entry for each element in the source document and wherein a value of each child entry identifies zero or more children of the element; and storing the generated arrays in memory or writing the generated arrays to one or more storage media. In addition, this technique may further comprise generating an attribute array, the attribute array comprising an attribute entry for each element in the structured document, wherein each attribute entry specifies a reference to a secondary array and wherein the secondary array comprises a secondary attribute entry for each of one or more attributes of those ones of the elements which have attributes, and a null value otherwise; and wherein each secondary attribute entry specifies a starting name position and one or (1) an ending name position or (2) a length for a name of the attribute, and a starting value position and one or (1) an ending value position or (2) a length for a value of the attribute.

The extensible structured notation may be XML, or another extensible structured notation. The technique may further comprise generating an output structured document from the arrays.

The present invention further provides a technique for creating a plurality of arrays to represent a source document encoded in a machine-oriented extensible structured notation ("mXML"), comprising: obtaining a node count from the source document; generating the arrays based on the node count; and processing a plurality of node specifications from the source document. The processing further comprises: obtaining an element name specification from the node specification; storing element name information in an element name array, using the element name specification; obtaining an attribute fist specification from the node specification; storing attribute information in an attribute array, using the attribute list specification; obtaining a child list specification from the node specification; storing child information in a child array, using the child list specification; storing parent information in a parent array, using the child list specification; obtaining an element value specification from the node specification; and storing element value information in an element value array, using the element specification. This technique may further comprise generating an output mXML document by traversing the plurality of arrays.

The present invention additionally provides a technique for efficiently transforming a structured document, comprising: creating an array-based representation of the structured document; obtaining an identification of a particular element of the structured document which is to be transformed; locating an entry for the particular element in the arrays-based representation; and transforming information represented by the located entry. Creating the array-based representation further comprises: creating an element name array to store information pertaining to a name of each of a plurality of elements in the structured document; creating an element value array to store information pertaining to a value of each of the elements; creating an attribute array to store information pertaining to a name and a value of each of zero or more attributes of each of the elements, creating a parent array to store information pertaining to a parent of each of the elements; and creating a child array to store information pertaining to zero or more children of each of the elements. In one aspect, the identification is an element name and the locating further comprises searching the element name array to find a match with the identification. In another aspect, the identification is an ordinal representing a relative position of the particular element in the structured document, and the locating further comprises using the ordinal as an index to access one or more of the arrays in the array-based representation.

The present invention will now be described with reference to the following drawings, in which like reference numbers denote the same element throughout.

BRIEF DESCRIPTION OF THE DRAWINGS

FIG. 1 illustrates a simple example of an XML document using the XML notation of the prior art;

FIGS. 4A and 4B illustrate a simple structured document created in the existing XML notation, and a tree structure representing this prior art XML document, respectively;

FIG. 4C depicts a structured document represented in mXML notation, according to a preferred embodiment of the first related invention, where this mXML document conveys an equivalent structure and equivalent document content as the XML document in FIG. 4A;

FIGS. 5A through 5E illustrate examples of arrays that may be created, according to a preferred embodiment of the present invention, to store the structure and content information of prior art structured documents such as XML documents and/or mXML documents;

DESCRIPTION OF THE PREFERRED EMBODIMENT

Figure 2:
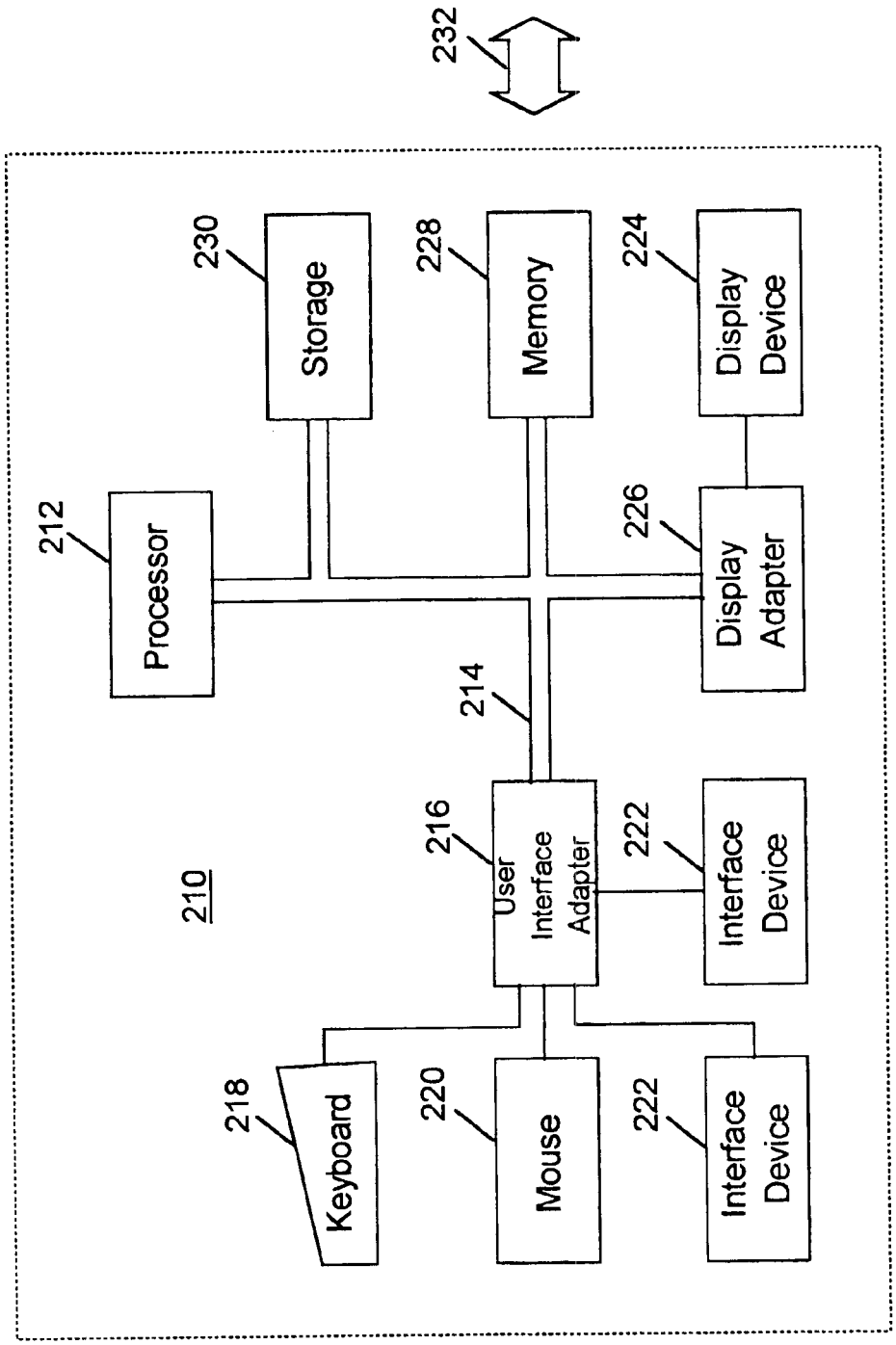
FIG. 2 is a block diagram of a computer workstation environment in which the present invention may be practiced.

FIG. 2 illustrates a representative workstation hardware environment in which the present invention may be practiced. The environment of FIG. 2 comprises a representative single user computer workstation 210, such as a personal computer, including related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a CDPD (cellular digital packet data) card. The workstation 210 may be associated with such other computers in a LAN or a wide area network (WAN), or the workstation 210 can be a client in a client/server arrangement with another computer, etc. All of these configurations, as well as the appropriate communications hardware and software, are known in the art.

The present invention may operate on a server or mainframe (referred to hereinafter as a server, for ease of reference), rather than on a workstation. The hardware environment of a server is well known in the art. Or, the present invention may operate on other computing devices such as personal digital assistants (PDAs), portable computing devices, etc. The arrays created through use of the present invention may be stored on permanent or removable storage media used by a computing device, and/or may be transmitted between such a device and a server, or between a server and another server, where these types of devices may be connected by a network.

Figure 3:
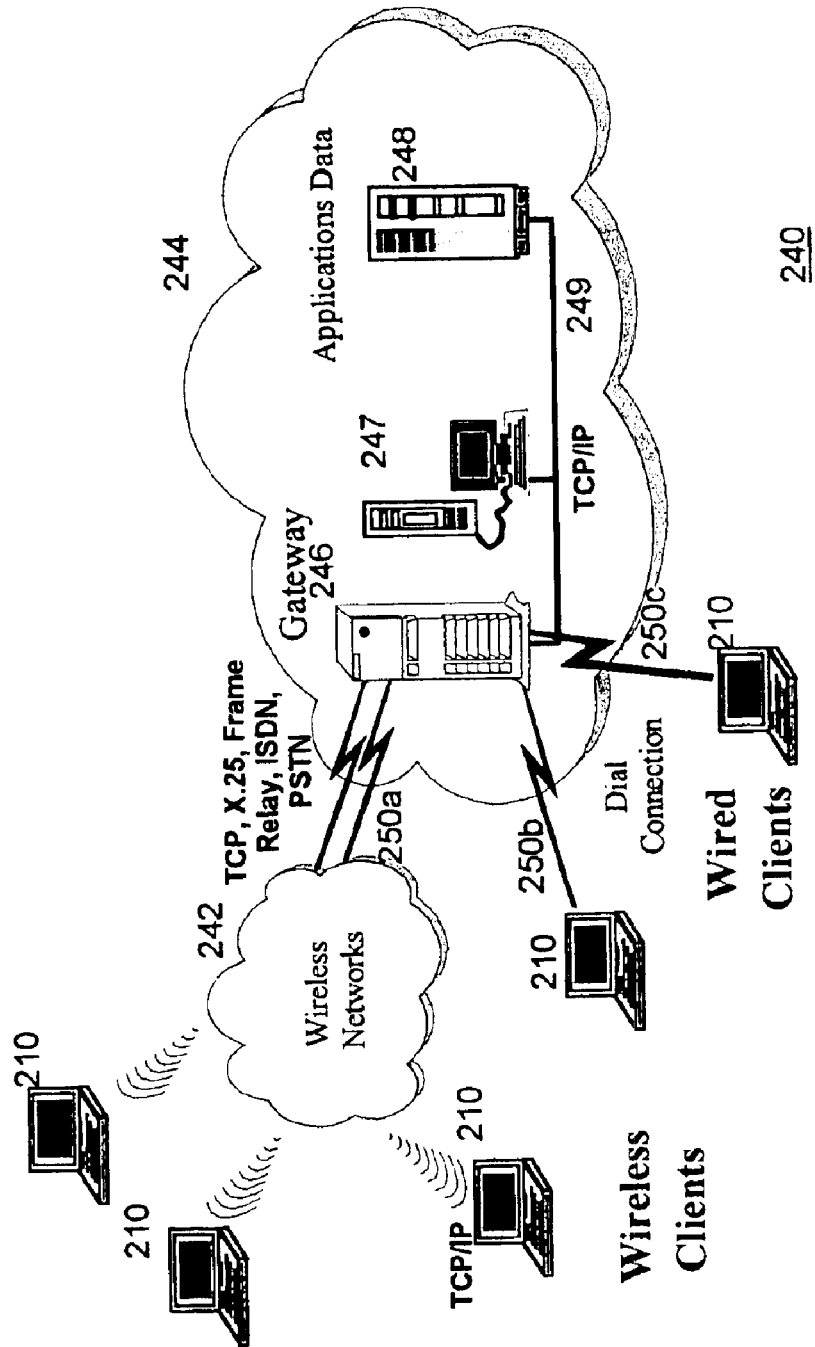
FIG. 3 is a diagram of a networked computing environment in which the present invention may be practiced.

FIG. 3 illustrates a data processing network 240 in which the present invention may be practiced. The data processing network 240 may include a plurality of individual networks, such as wireless network 242 and network 244, each of which may include a plurality of individual workstations 210. Additionally, as those skilled in the art will appreciate, one or more LANs may be included (not shown), where a LAN may comprise a plurality of intelligent workstations coupled to a host processor.

Sill referring to FIG. 3, the networks 242 and 244 may also include mainframe computers or servers, such as a gateway computer 246 or application server 247 (which may access a data repository 248). A gateway computer 246 serves as a point of entry into each network 244. The gateway 246 may be preferably coupled to another network 242 by means of a communications link 250a. The gateway 246 may also be directly coupled to one or more workstations 210 using a communications link 250b, 250c. The gateway computer 246 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 246 may also be coupled 249 to a storage device (such as data repository 248). Further, the gateway 246 may be directly or indirectly coupled to one or more workstations 210, and servers such as gateway 246 and application server 247 may be coupled to other servers such as server 243.

Those skilled in the art will appreciate that the gateway computer 246 may be located a great geographic distance from the network 242, and similarly, the workstations 210 may be located a substantial distance from the networks 242 and 244. For example, the network 242 may be located in California, while the gateway 246 may be located in Texas, and one or more of the workstations 210 may be located in New York. The workstations 210 may connect to the wireless network 242 using a networking protocol such as the Transmission Control Protocol/Internet Protocol ("TCP/IP") over a number of alternative connection media, such as cellular phone, radio frequency networks, satellite networks, etc. The wireless network 242 preferably connects to the gateway 246 using a network connection 250a such as TCP or UDP (User Datagram Protocol) over IP, X.25, Frame Relay, ISDN (Integrated Services Digital Network), PSTN (Public Switched Telephone Network), etc. The workstations 210 may alternatively connect directly to the gateway 246 using dial connections 250b or 250c. Further, the wireless network 242 and network 244 may connect to one or more other networks (not shown), in an analogous manner to that depicted in FIG. 3.

Software programming code which embodies the present invention is typically accessed by the microprocessor 212 (for example, of the workstation 210, server 243, gateway 246, and/or server 247) from long-term storage media 230 of some type, such as a CD-ROM drive or hard drive. The software programing code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programing code may be embodied in the memory 228, and accessed by the microprocessor 212 using the bus 214. The techniques and methods for embodying software programming code in memory, on physical media, and/or distributing software code via networks are well known and will not be further discussed herein.

The present invention may be used on a client computer or server in a networking environment, or on a standalone workstation (for example, to store a document or to process a document which has been received over a network connection, via a removable storage medium, etc.). (Note that references herein to client and server devices are for purposes of illustration and not of limitation: the present invention may also be used advantageously with other networking models.) When used in a networking environment, the client and server devices may be connected using a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc., having processing (and, optionally, communication) capabilities. The server, similarly, can be one of any number of different types of computer which have processing and communication capabilities. These techniques are well known in the art, and the hardware devices and software which enable their use are readily available.

In the preferred embodiment, the present invention is implemented in computer software. The implementation of this software may operate as one or more modules (also referred to as code subroutines, or "objects" in object-oriented programming) of one or more computer programs.

The present invention provides an array-based extensible document storage format for storing Extensible Markup Language (XML) source documents, or source documents encoded in other notations such as mXML. (The preferred embodiment is described herein in terms of the source document used with the present invention being an XML document or mXML document.) This array-based storage representation is designed to be significantly more efficient than the DOM tree representations that are typically used for internal storage and processing of XML documents in the prior ail, while still providing equivalent content and structure for the source document. In particular, these arrays provide for more efficient memory operations (or storage operations, if using storage instead of memory) and faster data manipulation speeds as contrasted to prior art DOM tree representations. DOM tree API (application programming interface) requests may also be satisfied faster through use of the present invention.

With more and more application programs being written to operate upon XML documents, the improvements yielded by this array-based storage representation have a significant impact. (The array-based approach discloses herein may also be used advantageously for representing documents that have been encoded in other structured document notations, and thus references herein to using the arrays of the present invention for XML and mXML documents are intended for purpose of illustration and not of limitation.)

The present invention also provides a method, system, and computer program product for operating upon (e.g. creating, and retrieving information from) these arrays.

The preferred embodiment of the present invention will now be described in more detail with reference to FIGS. 4 through 10.

According to the present invention, the internal data structure for extensible structured document processing utilizes arrays and integer pointers to link the nodes of a tree and to address the content and attributes for each XML (or mXML) node. This is in contrast to prior art internal DOM table structures, which maintain a physical tree structure by linking objects. The arrays used by the preferred embodiment of the present invention contain integer values which point to array elements and to data in one or more data buffers. Operations which in the prior art are performed on objects are performed on bytes (i.e. integer-valued array elements) in the present invention, significantly reducing processing time and memory management overhead. Based on this new data structure, construction and manipulation of tree-oriented extensible documents can be done very efficiently. The new data structure can satisfy DOM API requests much faster, using array indexing to a large extent (as will be described in more detail herein). (In the preferred embodiment, the existing DOM and SAX APIs are supported, but with different function/method signatures which are adapted to use of integers instead of objects.) In addition, this efficient array storage structure facilitates high performance XML transformations, including those of the type described in the second related invention. Furthermore, this array-based notation can optionally be externalized (for example, to represent the corresponding structured document on a storage medium such as a removable diskette, and also to efficiently transmit structured documents through a network).

Figure 4B:
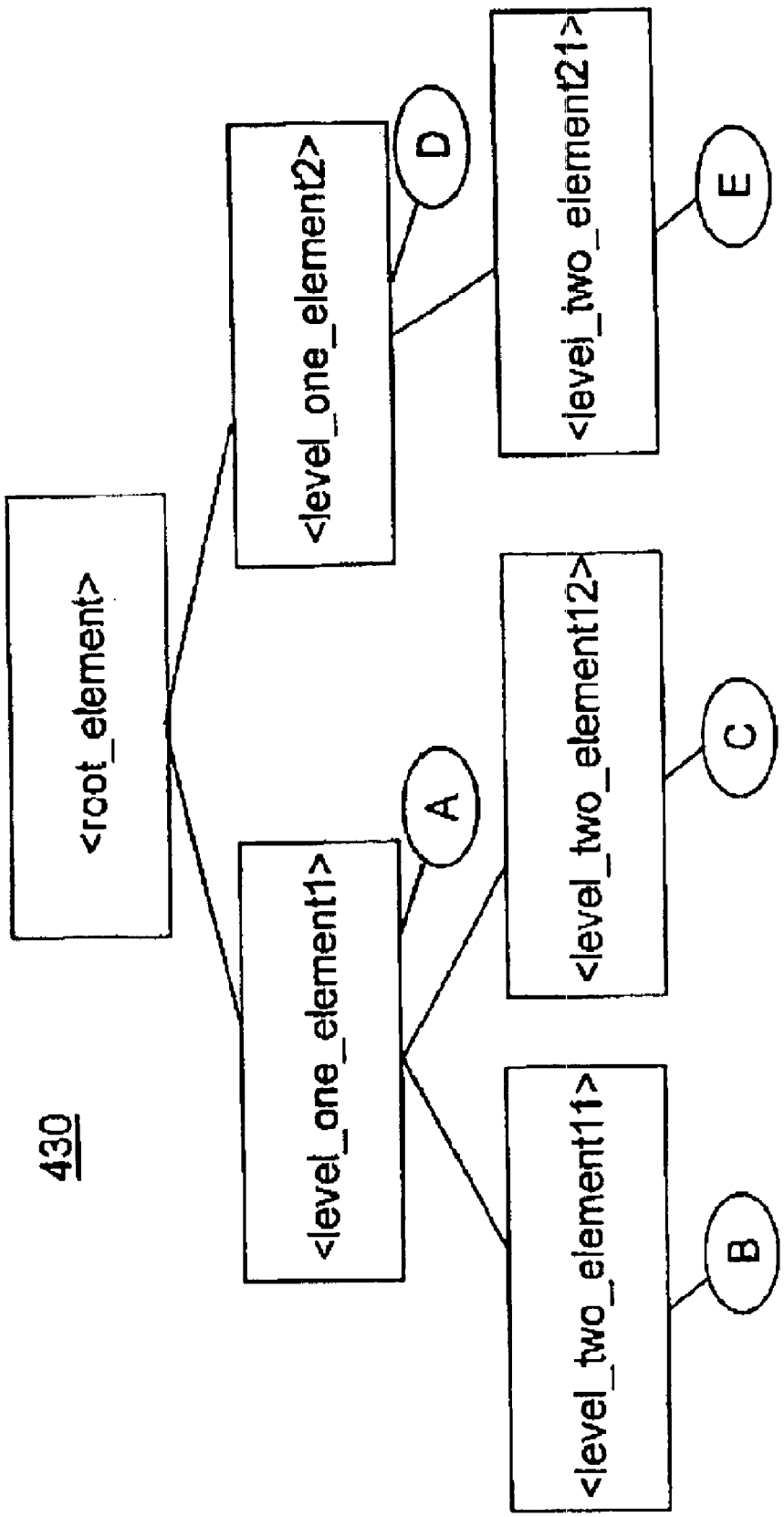

FIG. 4A illustrates a simple structured document 400 which is represented in the existing XML notation. This document contains 6 elements which are organized in a 3-level hierarchy. The Node having element name "root_element" 402 is the root node, being at the highest level of the hierarchy. This node has 2 child nodes, having element names "level_one_element1" 410 and "level_one_element2" 420. Node "level_one_element1" 410 also has 2 child nodes, which are the nodes having element names "level_two_element11" 412 and "level_two_element12" 414, and node "level_one_element2" 420 has a single child node having element name "level_two_element2 1" 422. A tree structure 430 representing document 400 is shown in FIG. 4B, where the tags for the 6 elements are depicted inside rectangular shapes representing nodes of the tee the data content corresponding to each node is shown inside an ellipse. This interpretation of an XML document 400 and its corresponding tree structure 430 are well known in the art.

FIG. 4C illustrates a structured document 460 using a preferred embodiment of the syntax of the mXML notation, as has been described in detail in the first related invention. This mXML document represents the same information as XML document 400 of FIG. 4A, and has the same tree structure as that shown graphically at 430 in FIG. 4B. Advantages of using mXML for extensible document representation have been discussed in detail in the first related invention, and will not be repeated here.

To operate on the DOM tree storage format shown in FIG. 4B according to the prior art, tree traversal operations are performed. For example, if a style sheet specifies that all occurrences of the text string "level_one" within element names of a structured document are to be replaced by the characters "H1", then all the objects representing nodes of the tree must be traversed to inspect their element names searching for the target string. While the example DOM tree contains only 6 nodes at 3 different levels, one of skill in the art will readily recognize that DOM trees for actual documents may contain hundreds or even thousands of nodes and may be nested many levels deep. Thus, in the general case a node-by-node traversal using objects is a very expensive process. (The terms "elements" and "nodes" are used interchangeably herein to refer to elements of a structured document and their corresponding nodes in a tree-structured representation thereof.)

FIGS. 5A through 5E provide an example of using the array-based storage format of the present invention as an alternative to a DOM tree representation. These example arrays represent the information from XML document 400 of FIG. 4A, and equivalently from mXML document 460 of FIG. 4C. These arrays provide a much more efficient storage format than the objects required for DOM tree 430 of FIG. 4B, with no loss of information content. Creating and accessing the arrays also requires less processing time as contrasted to DOM tree processing, and results in significantly more efficient memory management.

Figure 5D:
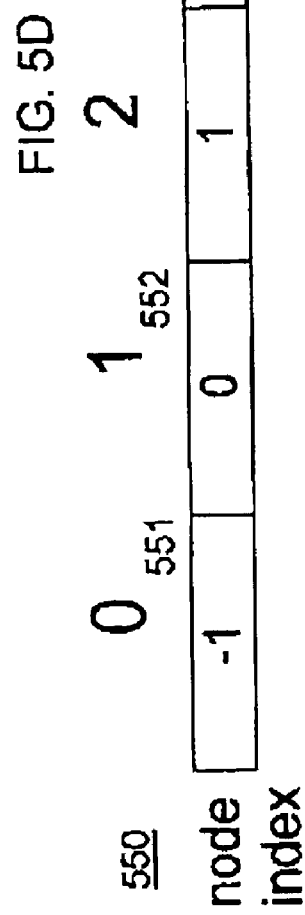

The arrays used in the preferred embodiment comprise: (1) an element name array (see FIG. 5A); (2) an element value array (see FIG. 5B); (3) an attribute array (see FIG. 5C); (4) a parent array (see FIG. 5D); and (5) a children list array (see FIG. 5E). Each of these arrays will now be described. The element name array, as shown in FIG. 5A, contains an entry for each element in the source document. Thus array 500 contains 6 entries, corresponding to the 6 elements (or nodes) in the source document. The entry for each element preferably contains 3 values. In the preferred embodiment, the values are: (1) a pointer or index 501 to be used as an offset for determining where this element's name starts within a buffer referred to herein as the "mXML buffer", (2) the length 502 of the element's name; and (3) a pointer 503 to the beginning of the mXML buffer. (Alternatively, the element name length 502 may be replaced by a pointer or index denoting where this element's name ends; however, this alternative representation requires slightly more characters in the general case.) The starting offset value 501 is then added to the pointer 503 to determine the name's starting position within the mXML buffer.

The mXML buffer described herein Ray comprise a copy of an mXML document, or an mXML document with its associated data buffer removed. (As explained in the first related invention, a data buffer sequentially follows the structure information for an extensible document that is encoded using a preferred embodiment of the mXML notation.) Or, the mXML buffer pointer may simply point to the start of a corresponding mXML document. Similarly, the data buffer to be described with reference to FIGS. 5B and 5C may be a copy of the data buffer portion of an mXML document, or it may be located using a pointer that points to the start of the data buffer portion within an mXML document (or copy thereof). The descriptions herein refer to using the mXML document 460 of FIG. 4C, where the pointer 503 points to the beginning 470 of that mXML document and the data buffer pointer points to the start 480 of the data buffer portion thereof.

Referring to the first entry 505 in the example element name array 500, it can be seen that the name of the first element (i.e. the element having index or ordinal 0) begins at position 2 within the mXML buffer, and extends for a length of 12 characters. As shown in FIG. 4A, the name of the first element of the source document is "root_element". This element name does in fact appear beginning at position 2 of the mXML buffer 470 shown in FIG. 4C and extending up through and including position 13 (for a total length of 12 characters). Similarly, the name of the second element (having index or ordinal 1) from the second array entry 506 begins at position 22 and extends for a length of 18. Referring to FIGS. 4A and 4C, it can be seen that these values identify the element name "level_one_element1".

In the preferred embodiment, the element value array (as shown in FIG. 5B) also contains an entry for each element in the source document, regardless of whether that element has a value. Again, the entry for each element preferably contains 3 values, and in the preferred embodiment, these values are: (1) a pointer or index 511 denoting the offset of where this element's value starts within the mXML buffer; (2) the length 512 of the element's value; and (3) a pointer 513 to the beginning of the mXML data buffer. (Alternatively, the element value length 512 may be replaced by a pointer or index denoting where this element's value ends; however, as discussed above with reference to element names, this alternative representation requires slightly more characters in the general case.)

In the preferred embodiment, elements which have no value use a special designation for the starting pointer 511 (and optionally for length 512). Entry 515 shows the value "−1" being used to indicate that this element (the root element 402, in this case) has no value. By including an entry in element name array 500 and in element value array 510 for each element, it becomes quite simple to find the value corresponding to a particular element name: the same index value can be used to index into both arrays. For example, to locate the name and value of the fourth element, an index value of "3" accesses entry 507 in the name array. Using the starting position 93 as an offset within the mXML buffer, along with length value 19 (as specified in this element's entry 507), the name is found to be "level_two_element12". Accessing the element value array 510 using an index value of "3", entry 516 indicates that the element's value begins at offset 10 within the data buffer and extends for a length of 1. Referring to the data buffer pointer 480 in FIG. 4C, the value of this element can be seen to be the single character "C". This is in agreement with the value of element 414 as shown in FIG. 4A. (A more realistic example may be one in which a search of the element name array 500 is first performed to determine the proper index value for an element having a particular name, and then locating the element's value by using this determined index value to index into the element value array 510. See the discussion FIG. 10A, below, for this type of search.)

In an alternative embodiment, the element name and element value arrays shown in FIGS. 5A and 5B may be replaced by arrays wherein the entry for each element contains only 2 values, rather than 3 as depicted. This alternative requires that the address or pointer 503 identifying the start of the mXML buffer and the address or pointer 513 identifying the start of the data buffer are stored in a centrally-available location (such as a separate array having only these 2 entries). When this alternative array structure is used, the otherwise redundant information stored as buffer pointer 503 in all entries within element name array 500 and as buffer pointer 513 in all entries of element value array 510 can be eliminated. The value from the centrally-available location is then used instead when determining the starting location within the appropriate buffer. Similarly, data buffer pointer 535 may optionally be removed from the attribute entries 530, 540 of the attribute array 520 when using this alternative embodiment. However, explicitly including pointer 503, pointer 513, and pointer 535, as depicted in the examples of FIG. 5, provides the flexibility of using more than one buffer for storing mXML structure information and for storing mXML data buffer content.

Attribute array 520, as shown in FIG. 5C, also preferably has an entry for each element in the source document. In the preferred embodiment, the attribute array entry for each element contains either (1) a null value for elements having no attributes or (2) a pointer for elements that do have attributes. An example of the former case is shown at entry 521, indicating that the root element 402 has no attributes. When the entry contains a pointer, this pointer addresses another array structure such as that shown at 530 and 540 of FIG. 5C, which will be referred to herein as a "secondary array". The number of entries in each secondary array depends on how many attributes the corresponding element has. Secondary array 530 has 2 entries 536, 537, corresponding to the 2 attributes "id" and "name" of the element named "level_one_element1" (see 410 of FIG. 4A). In the preferred embodiment, the secondary array entry for each attribute has 5 values, which are: (1) an offset to be used in locating the start of the attribute's name, (2) the length of the attribute name, (3) an offset to be used in locating the start of the attribute's value, (4) the length of the attribute value; and (5) a pointer to the start of the data buffer in which the attribute name and value are stored. This data buffer pointer (5) is to be added to the starting offsets specified in values (1) and (3) in order to locate the content of the attribute name and value. (As described above, an alternative embodiment may remove this final data buffer pointer value from each secondary array entry, and store it once in a central location instead.)

The example entry 536 in secondary array 530 indicates (in the values at 531 and 532) that this attribute's name starts at offset 0 within the data buffer and extends for 2 positions. Referring to the data buffer 480 in FIG. 4C which is pointed to by the pointer at 535, it can be seen that this is a reference to the characters "id". This entry also indicates (in the values at 533 and 534) that the attribute value starts at offset 2 within the data buffer and extends for 1 position. Data buffer 480 contains the character "1" at this position. Thus, the first attribute for the element having index or ordinal 1 (at 522) has the name "id" and the value "1". Evaluating the content of entry 537, it can be seen that this element's second attribute has the name "name" (starting at offset "3", for a length of 4 characters) and the value "1" (starting at offset 7 for a length of 1 character). If the element had more than 2 attributes, then secondary array 530 would contain additional entries formatted in the same way as entries 536 and 537. Secondary array 540 is processed in an identical manner.

While the preferred embodiment stores element values, attribute names, and attribute values in a single data buffer, in an alternative embodiment more than one such buffer may be used. Attribute names and attribute values must be stored together in a single buffer, however, unless an additional value is added to each entry of secondary array 530 to enable addressing 2 different buffers, The parent array 550 shown in FIG. 5D, and the children list array 560 shown in FIG. 5E, also preferably contain entries for each of the elements in the source document. For the root element, which has no parent, parent array 550 contains a special indicator (as shown at 551) to show that there is no corresponding parent for this element of the document. (Initially, there will be only one such entry in the parent array for a particular structured document. Other such entries may be written, for example, when elements are deleted, as is described in more detail below with reference to FIG. 10B.) Each of the other entries 552, etc. contains the index number of the entry in the parent array where its parent is located. Thus, the parent of the element whose entry has index 1 is the element whose entry has index 0 (see 552), and this parent element associated with index 0 is also the parent of the element whose entry has index 4 (see 553). Analysis of the values in parent array 550 yields an identical logical tree structure as that graphically depicted in FIG. 4B.

The entries in children list array 560 for elements having no children preferably contain a special indicator (such as a null value), for example as shown for entries 563 and 564 which correspond to the leaf nodes 412, 414 in FIG. 4A. For each element that does have children the children list array entry of the preferred embodiment contains a pointer to a list (i.e. a 1-dimensional array) of the index values of those children. For example, entry 561 for root element 402 points to list 570, which stores index values 1 and 4. These index values identify elements 410 and 420 of FIG. 4A, as can be confirmed by inspecting entries 506 and 508 (which use index values of 1 and 4, respectively) of element name array 500 (where these entries 506 and 508 show that the names of the elements are "level_one_element1" and "level_one_element2", using offsets 22 and 121 into the mXML buffer at 470 with a length value of 18 in both cases).

In an alternative embodiment wherein the source document notation does not use attributes, the attribute array depicted in FIG. 5C may be omitted. An example of such a notation is the XML subset referred to in the technical community as "SML", for "Simple Markup Language". The XML notation includes a number of notational elements which are not strictly necessary for data-entered document specification. SML is therefore being proposed as a notation that uses a core set of XML syntax, and omits features including attributes, processing instructions, etc. (This notation is described in more detail in the first related invention; the discussion will not be repeated herein.)

The first related invention also describes support of additional node types from structured source documents, beyond those for which arrays have been defined for the preferred embodiment of the present invention. Examples of these additional or "special" node types include comments, processing instructions, CDATA, entity, entity reference, and document type nodes. The first related invention describes use of 2 types of node specifications within an mXML document to support these special node types. The first type of node specification occurs in-line and has an empty name and attribute list. The child list of this node specification points to another node specification for a "text" node, where the text node has an empty name, child list, and attribute list. A pair of special indicators in the value of the first type of node specification identifies the type of special node, and the value of the text node provides a pointer to a starting location within the data buffer and a length, where this value information is used to locate the actual content of the special node. When supporting these special node types, the entry in the element name array (see FIG. 5A) and attribute array (see FIG. 5C) for both types of node specification preferably contains all null values. The entries in the parent and child arrays (FIGS. 5D and 5E) are preferably created in the same manner as described herein for the source syntax supported in the preferred embodiment. The entries in the element value array (FIG. 5B) for the first type of node specification preferably store the special values from the comma-separated value list as the entries at 511 and 512, and a null pointer at 513. The entries in the element value array for a text node are preferably created in the same manner described herein for elements having values in the source syntax of the preferred embodiment (that is, by storing the values from the comma-separated value list as the entries at 511 and 512, and a pointer to the data buffer at 513). In this manner, the content of the special node types as well as their location within the overall structure of the source document is easily added to the array-based storage representation.

Figure 6:
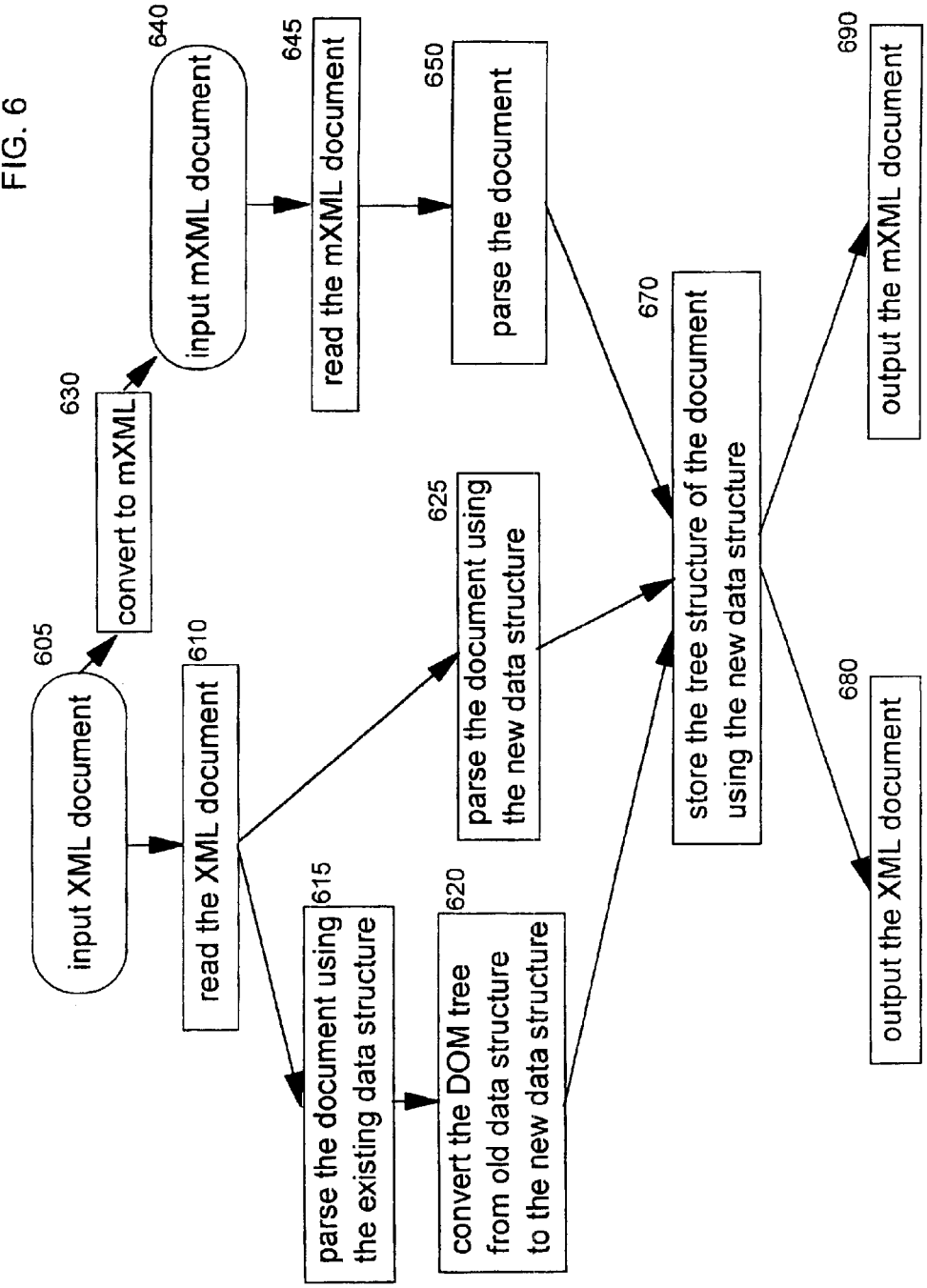
FIG. 6 provides a flowchart illustrating an overview of processing paths that may be taken when creating the array-based storage format of the present invention.

Referring now to FIG. 6, a flowchart is provided which illustrates an overview of processing paths that may be taken when creating the array-based storage format of the present invention. This array-based storage format may be used for storing the information from a source XML document 605, or from a source mXML document 640. The manner in which the mXML notation was designed enables a computer to quickly and efficiently scan through the mXML document 640 (as indicated at 645), and the corresponding arrays can be built and stored 670 quite easily after the document has been parsed 650. (This process is described in detail below, with reference to FIG. 8.) To create the arrays corresponding to an XML document 605, the XML document 605 can first be converted 630 to an mXML document 640 (using techniques such as those which have been described in the first related invention), or the arrays may be created by processing 610 the XML document 605 directly. For this latter case, (at least) two alternatives exist. First, a prior art parser may be used 615 to create a prior art DOM tree, which can then be converted 620 to the new array-based structure by reading the DOM and writing the corresponding array elements. (The first related invention describes this approach in detail, wherein a DOM is first created and is then traversed to convert an XML document to an mXML document. One of ordinary skill in the art will readily understand how the creation of the array-based structures can be substituted for generation of the mXML syntax.) Or, a parser can operate 625 directly on the XML document 605, parsing the elements of the document and building 670 the new array-based structures. (This process is described in detail below, with reference to FIG. 9.)

Once the arrays have been created, the content stored therein can be used to generate output documents in either the XML 680 or mXML notation 690, as needed by a particular environment in which the present invention operates. (The content 670 stored in arrays according to the present invention may be transformed prior to creating an output document. Examples of simple transformations will be described herein with reference to FIG. 10. In addition to, or instead of, such transformations, high-performance transformations of the type disclosed in the second related invention may be performed.)

Figure 7:
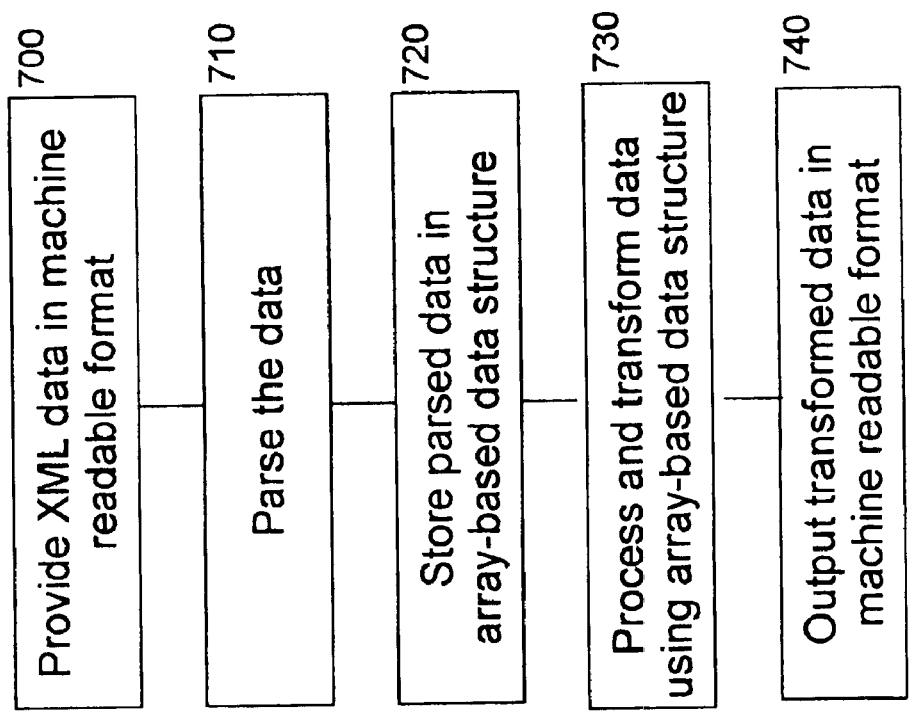
FIG. 7 provides a flowchart which illustrates an overview of processing steps that may be used when the first related invention and second related invention are used in combination with the present invention.

The flowchart in FIG. 7 provides an overflew of processing steps that may be used when the first related invention and second related invention are used in combination with the present invention. (Alternatively, the advantages of the present invention may be realized when it is used with only the first related invention, with only the second related invention, and also when it is used without either of the two related inventions.) As shown at Block 700, a source document is provided in the machine-readable mXML format defined in the first related invention. This source document is then parsed (Block 710), and the data resulting from the parsing process is stored using the array-based structure of the present invention (Block 720). The information in the array-based structure may then be processed directly, using simple array transformations as will be described in more detail herein or using the high-performance transformation technique disclosed in the second related invention (Block 730). The result of the transformation may then be output as an mXML document (Block 740) using the notation as disclosed in the first related invention. Alternatively, the result of Block 730 may be written out as a conventional XML document, if needed.

Figures 8, 8A:
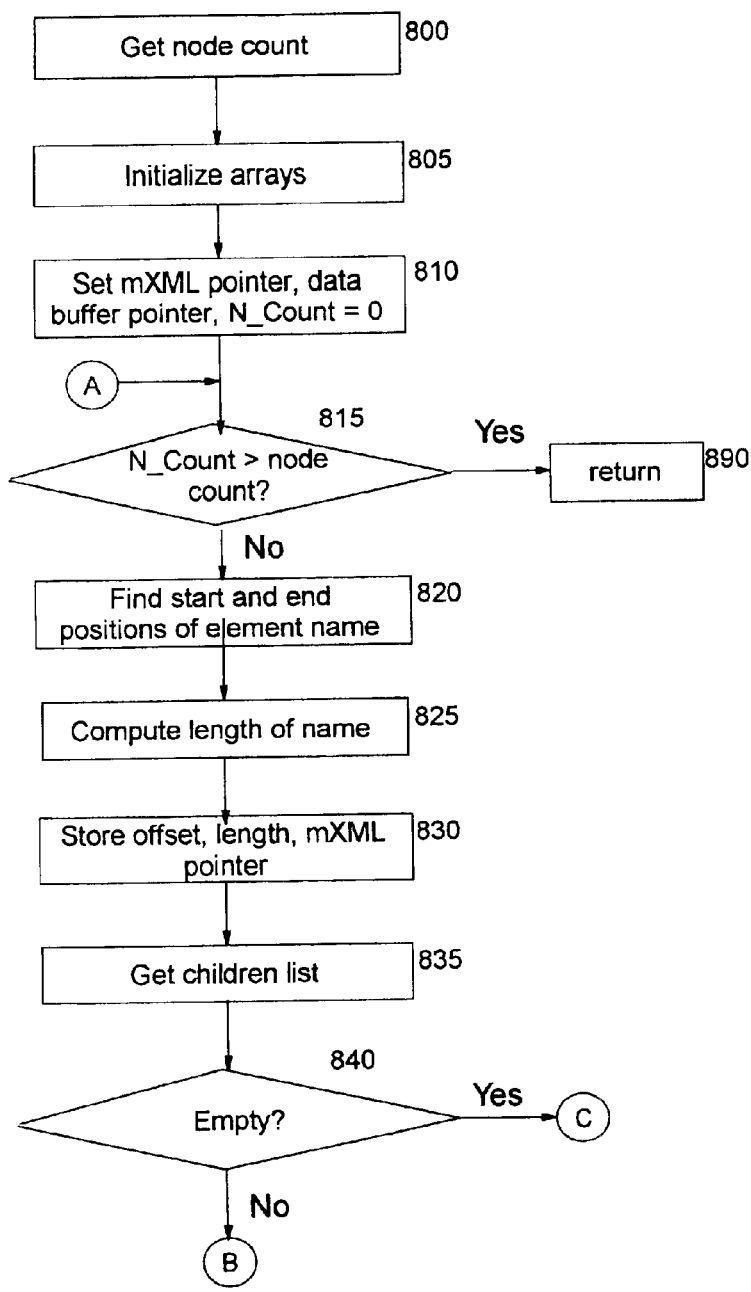
FIG. 8 provides a flowchart which sets forth the logic which may be used to create an array-based storage representation from an mXML document, according to a preferred embodiment of the present invention, FIG. 9 provides a flowchart which sets forth the logic which may be used to create an array-based storage representation from an XML document, according to a preferred embodiment of the present invention.
Figure 8B:
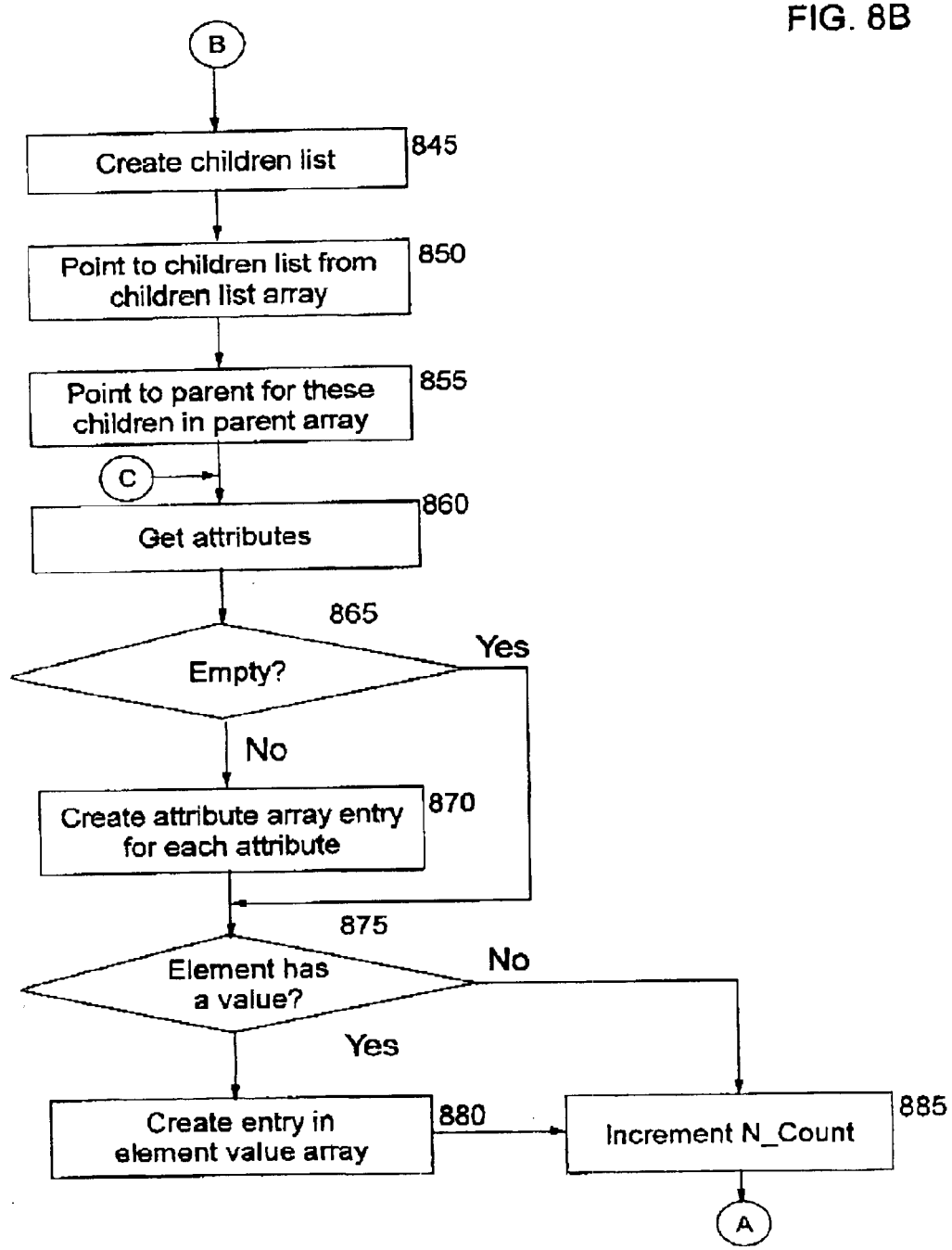
Figure 9:
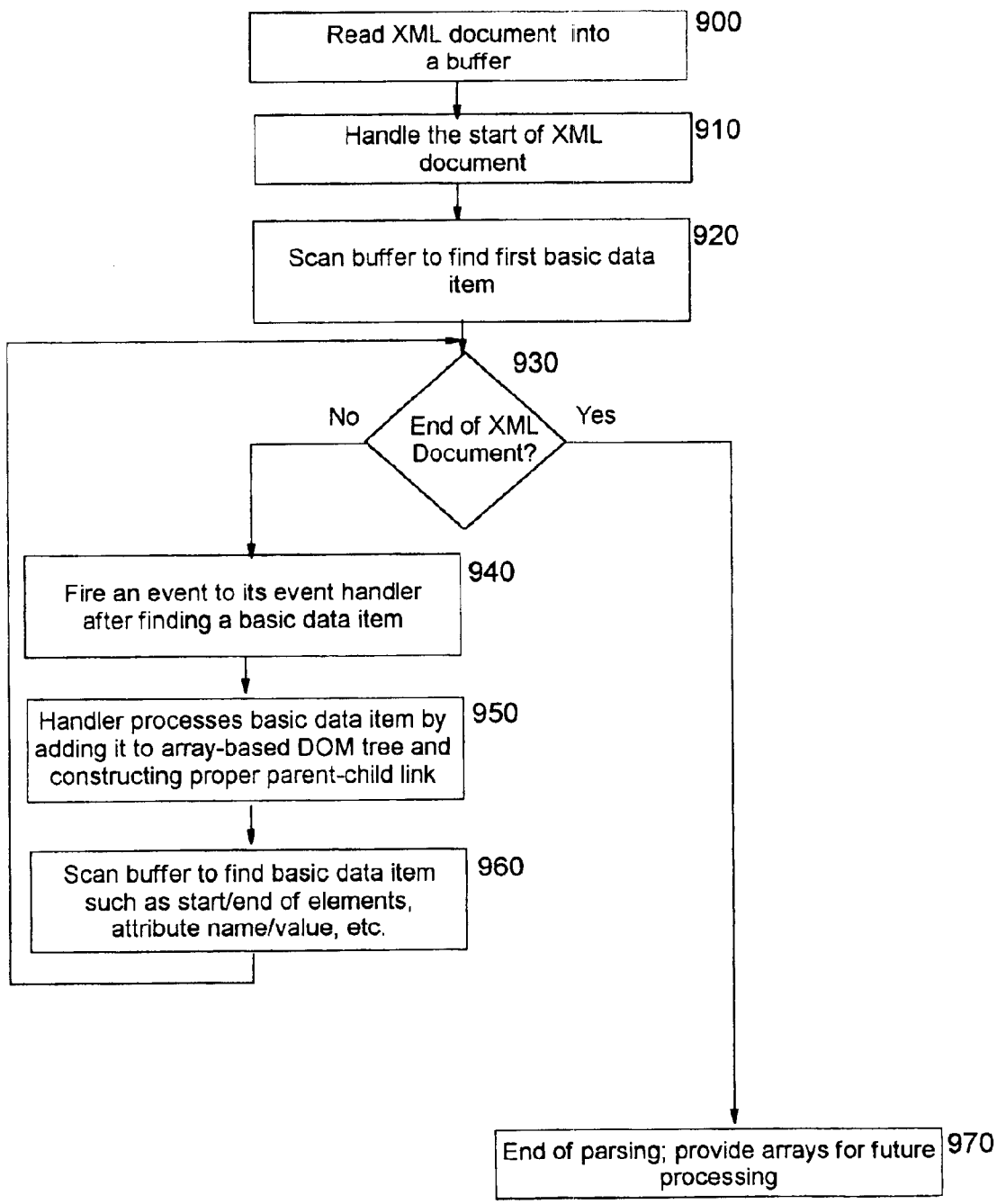

FIG. 8 provides a flowchart which sets forth the logic which may be used to create an array-based storage representation from an mXML document (such as document 460 of FIG. 4C), according to a preferred embodiment of the present invention. The mXML format makes it particularly easy and efficient to parse the document and construct an array-based representation thereof (according to the logic of FIG. 8, for the preferred embodiment), where this array-based representation provides a logical document tree on which operations may be performed. The efficiency as contrasted to prior art techniques comprises fast data scanning, less frequent memory allocation and de-allocation, and less object manipulation. (The preferred embodiment of this parsing process of FIG. 8 is described with reference to the preferred embodiment of the mXML syntax, as disclosed in the first related invention. A number of alternative syntax representations were also disclosed therein. It will be obvious to one of ordinary skill in the art how this parsing process may be altered to adapt to those or other changes in the mXML syntax.)

At Block 800, the node count is retrieved from the source mXML document. As discussed in the first related invention, the node count is preferably the first token of an mXML document, and is followed by a delimiter which in the preferred mXML syntax is an opening parenthesis. (Alternatively, a semi-colon or other delimiter may separate this node count from the data buffer size or data buffer starting offset, as discussed in the first related invention with reference to alternative embodiments of the mXML syntax.)

Once the node count is known, the size of the arrays to be allocated is also known (with the exception of the secondary arrays used for attributes, as described with reference to FIG. 5C). Block 805 therefore allocates and initializes new arrays for the element names element values, attribute list, parent, and child list values, where the number of elements in the arrays is a factor of the node count, and each array preferably has the structure as shown in the examples of FIG. 5. Each value in the arrays is preferably initialized to the special indicator (as discussed with reference to FIG. 5, such as a null or "−1" value) used to signify that the value is empty. By storing information such as the node count in advance within the mXML document, the parsing process of FIG. 8 can minimize its memory operations when constructing the corresponding arrays by allocating most of the memory it needs at this point in the beginning of its operation, thereby reducing the number of computationally expensive memory allocation (and de-allocation) operations it must perform. This approach also enables minimizing the high cost of garbage collection operations that occur when memory is being allocated and de-alocated frequently.

To reiterate the array structures described with reference to the examples in FIG. 5, each array element is preferably defined to store an integer value. The element name and element value arrays are preferably 2 dimensional arrays where the number of array elements in the first dimension is equal to the node count and the number of array elements in the second dimension is 3. The parent array is preferably a 1-dimensional array where the number of array elements is equal to the node count. The memory for these arrays can be allocated completely at this point. The attribute list array and children list array are preferably each 1-dimensional arrays, again having a number of array elements equal to the node count, where individual ones of these array elements may point to other array structures that will be dynamically created during the parsing process. The amount of additional memory required for the dynamically-generated lists used for the children list array is equal to the number of nodes −1, and thus this amount of memory may be allocated in advance. The amount of memory required for the dynamic structures of the attribute list array is not known, however, and therefore cannot yet be allocated. (In an alternative embodiment, an mXML document might contain an explicit attribute count. In this case, this count can be used to allocate sufficient memory for 2-dimensional arrays having a first dimension equal to the count of attributes, and the second dimension set to 5, when using the structure shown in FIG. 5C.)

Note that while the preferred embodiment refers to storing the arrays in memory, an alternative implementation may store the arrays using a storage medium such as disk storage. References herein to use of memory are therefore intended for purposes of illustration and not of limitation.

Block 810 performs a number of initialization operations for the parsing process. In the preferred embodiment, the mXML buffer pointer, to be used for offsets of element names, is set in Block 810 to point to the start of the mXML document. Block 810 also sets the data buffer pointer to point to the start of the data buffer within the mXML document. These pointer values correspond to the locations shown at 470 and 480 of the example mXML document in FIG. 4C. (As stated earlier, in an alternative embodiment the data content may be copied into a separate data buffer, and/or the mXML document content preceding the data buffer area may be copied into a separate mXML buffer. These buffers, when used, may be allocated at this point in the processing.) The size requirements of the required buffer(s) can be easily determined from the information in the source mXML document.

The location to which the data buffer pointer should be set may be determined by performing a backward scan through the source mXML document to locate the final closing delimiter (a ")" in the preferred embodiment of the mXML notation). The data buffer then begins in the next-sequential position of the mXML source document. When a separate data buffer is used to store the source document's data content (e.g. its element values, attribute names, and attribute values), the starting location of the data buffer within the source document can also be used to compute the length of the data buffer that will be needed to store the content. In an alternative embodiment of the mXML syntax, as discussed in the first related invention, the length of the data buffer may be explicitly specified within an mXML document (for example, following the node count value). In this latter case, the backward scan and computation are not required.

Block 810 also initializes a node counter to 0. This node counter will be used to keep track of which index value to use when inserting values for each element of the source mXML document into the arrays. This node counter will be referred to herein as "N_Count" to distinguish it from the node count value stored in the mXML document.

A parser operating on a source document encoded in mXML does not need to learn how to construct a DOM tree for a particular document, as contrasted to the prior art which requires scanning an XML document, and a number of compute-intensive operations can therefore be eliminated when using the array-based storage format of the present invention. Instead, the explicit, already-stored structure (and content) information in the source mXML document is simply read sequentially by scanning the mXML document, and the values read during the scan are used to build a corresponding structure in the arrays by iterating through the logic of Blocks 815 through 885. This parsing process is much faster than constructing many objects, as is done in prior art DOM tree creation.

The test in Block 815 asks whether all nodes in the source mXML have been processed. This test has a negative result when N_Count is less than or equal to the node count from the source mXML. In this case, processing continues at Block 820; otherwise, when the test has a positive result, the parsing process is complete, with the arrays being fully constructed, and the processing of FIG. 8 ends (Block 890).

The parsing process will be described herein in terms of the preferred embodiment of the mXML syntax—in particular, searching for particular characters that are defined as delimiters in the mXML notation, and encountering specific notational elements in a specific order. The first related invention describes in detail which delimiters are preferably used and the order in which notational elements preferably appear, as well as a number of changes that may be made to use alternative delimiters and different ordering. The parsing description which follows refers only to at the delimiter syntax and ordering of the preferred embodiment of the mXML notation; it will be obvious how this process may be adapted to other embodiments of the mXML syntax.

Block 820 locates the name of the current mXML element from the source mXML. This comprises scaling until finding the location of the next-sequential opening "(", which begins a node specification, and then scanning until finding the next semi-colon delimiter. The element name consists of the characters in between these 2 delimiters. The name's starting position is therefore the position following the opening "(" delimiter, and its ending position immediately precedes the semi-colon delimiter.

The length of the element name is computed at Block 825 using the equation (ending position−starting position+1). Block 830 stores this element's information in the element name array, where the value of N_Count is used to determine which array element the information is to be stored in. The values of the appropriate array element (see the description of FIG. 5A) are set to the starting position of the name, the length computed in Block 825 (or, alternatively, the ending position, as was discussed earlier), and the mXML buffer pointer that was created in Block 810.

Block 835 scans to find this mXML element's children list in the mXML source. The children list begins after the semi-colon which ends the element's name, and continues up to the next semi-colon delimiter. The children list comprises a comma-separated list of integer values which identify the relative positions element's child elements. Block 840 asks whether the children list was empty. This test has a positive result when 2 semi-colon delimiters appear in sequence, with no list of child elements. If there were no children, control transfers to Block 860; Blocks 845 and 855 process the children list.

Block 845 and 850 create the appropriate entries for this mXML element in the children list array. At Block 845, the integer values from the comma-separated children list are entered into elements of a 1-dimensional array structure (as shown at 570 in FIG. 5E). A pointer to this array structure is then inserted into the children list array (Block 850). The value of N_Count is used to determine the index of the element in the children list array to be used in storing the pointer.

Block 855 then creates entries in the parent array, using the integer values from the comma-separated children list. Each value in this list is used as an index into the parent array, and the array element having that index is set to the value of N_Count (such that the value stored at the child's index now identifies the index of its parent).

Blocks 860 through 870 process any attributes of the current mXML element. Block 860 scans the source mXML to find the attribute list. This list begins after the semi-colon delimiter which ends the children list, and continues up to the next semi-colon delimiter. Block 865 tests whether this list was empty. If so, control transfers to Block 875; otherwise, processing continues at Block 870.

Block 870 creates entries in the attribute array for each attribute in the attribute list. The information for each attribute is specified as a dot-separated list of 4 integer values, and this dot-separated list is separated from the next attribute's information by a comma. A 2-dimensional array structure is used for each attribute list, as discussed earlier. The first attribute's information is inserted into the first array element of this structure, the second attribute's information into the second array element, and so forth. The values of each array element (see the description of FIG. 5C) are set to the starting position of the attribute name (which is simply the first integer value from the dot-separated list), the length of the attribute name (the second integer from the dot-separated list), the starting position of the attribute value (the third integer from the dot-separated list), the length of the attribute value (the fourth integer from the dot-separated list), and the data buffer pointer that was created in Block 810.

The test in Block 875 asks whether this mXML element has a value. The value, if any, is specified using a comma-separated list that is located between the semi-colon delimiter that ends the attribute list and the closing ")" that ends the node specification. If there is no value in this location, control transfers to Block 885. Otherwise, the value is inserted into the element value array (Block 880), using N_Count to as an index determine the proper array element within the element value array. The values of this array element (see the description of FIG. 5B) are set to the starting position of the element value (which is simply the first integer value from the comma-separated list), the length of the element value (the second integer from the comma-separated list), and the data buffer pointer that was created in Block 810.

Block 885 then increments the value of N_Count, and control returns to Block 815 to determine whether there are more mXML demerits to be parsed and processed.

An XML document may be parsed directly into the array-based structure of the present invention. A preferred embodiment of the logic for performing this operation will now be described with reference to the flowchart in FIG. 9. First, the source XML document is read into a buffer (Block 900). The start of the XML document is then handled (Block 910). This comprises creating node specifications for any special node types, such as processing instructions, comments, etc., as has been previously discussed. Block 920 then scans the buffer to find the first basic data item (e.g. the start of an element node). The test in Block 930 asks whether the end of the input XML document has been reached in the buffer. If not, processing continues at Block 940 where an event is fired to a corresponding event handler, based upon the type of basic data item that was just located in the scanning operation. The handler operates (Block 950) to process this basic data item, adding it to the array-based DOM tree representation and constructing the proper parent-child links (in an analogous manner to that which has been discussed above for items from an mXML document). Block 960 then scans through the data buffer to locate the next basic data item, after which control returns to Block 930 to enable iterating through the entire data buffer contents. Upon reaching the end of the data buffer, the test in Block 930 has a positive result, and control transfers to Block 970 where the arrays may be provided to another process (including a process which will read the arrays and generate a corresponding mXML document) according to the needs of a particular implementation.

In view of the descriptions of generating the array-based structures for mXML documents (FIG. 8) and for XML documents (FIG. 9), it will be obvious to one of ordinary skill in the art how to perform the reverse process of generating the document syntax from the array-based information.

The information stored in the array-based representation of the present invention may be processed to create a DOM tree, if desired, where DOM tree operations can then be performed on the resulting tree structure as in the prior art. However, it is preferable to directly process the array-based representation of the present invention for retrievals and performing transformations (for example, to locate information about a particular element, to determine the overall structure of the document, to rename an element, etc.), as will now be described with reference to the flowcharts in FIGS. 10A through 10C. These flowcharts provide examples of the logic which may be used to efficiently perform retrievals and simple transformations upon a structured document by operating upon the corresponding array-based storage representation thereof, according to a preferred embodiment of the present invention. High-performance transformations may also be performed using the array-based representation, as is described in detail in the second related invention.

Figure 10A:
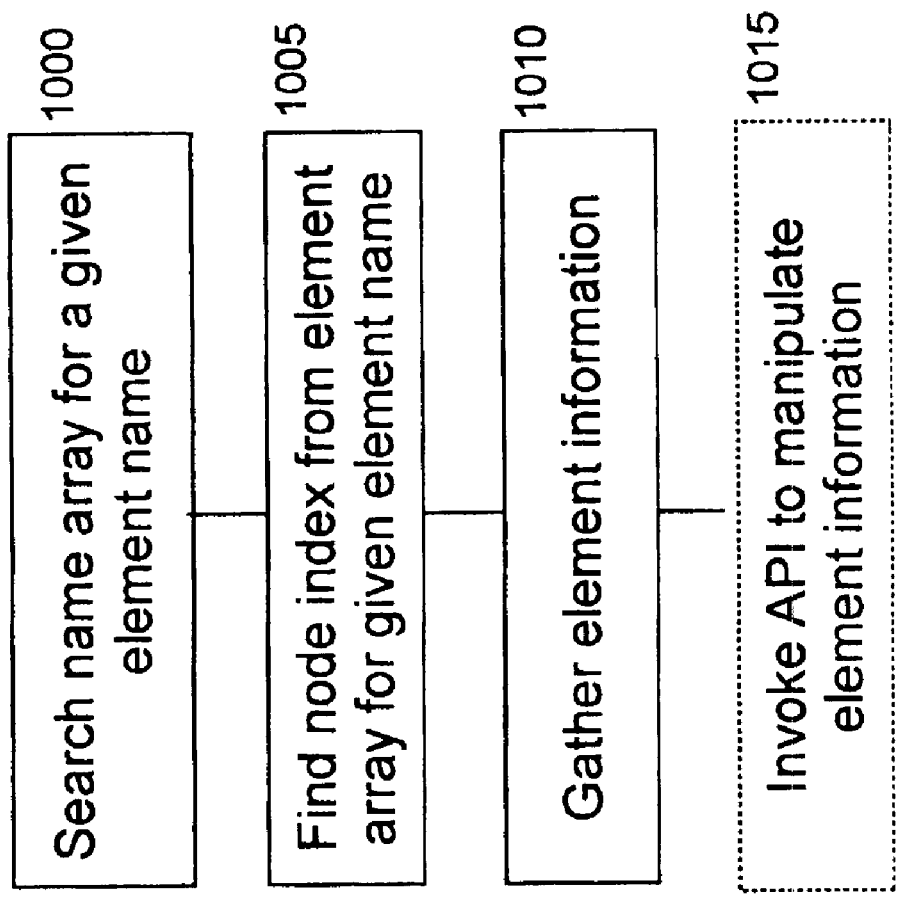
FIGS. 10A through 10C provide flowcharts which set forth examples of the logic which may be used to perform transformations upon a structured document by operating upon the corresponding array-based storage representation thereof, according to a preferred embodiment of the present invention.

FIG. 10A depicts a preferred embodiment of the logic which may be used to retrieve information from the arrays of the present invention, and to manipulate that information. This type of operation may be performed by a style sheet processor, by an executing application program, and so forth. As examples of retrieval operations that may be preformed directly on an array-based representation of a structured document, it may be necessary to determine an element's children or perhaps its parent. Or, the element's value or attributes may be needed. A typical process begins by searching through the element name array (Block 1000) to locate the element having a particular name. This comprises using the starting and offset values, along with the mXML buffer pointer, to find the text of the element name, and comparing that text to the particular name of interest. (Alternatively, the node index may be known in some cases, in which this search is not required.) Block 1005 then gets the node index of the element array entry with the matching name. (In some cases, multiple array entries may have the matching name, and the index of each such entry is then obtained, for example by building a list of indexes, in Block 1005.) Block 1010 gathers the information about this element, such as its value from the element value array, its parent, its children, etc. This information is retrieved easily and efficiently using the located node index to index into the other arrays. An API may optionally be invoked, as shown at Block 1015, to manipulate this element's information.

Figure 5E:
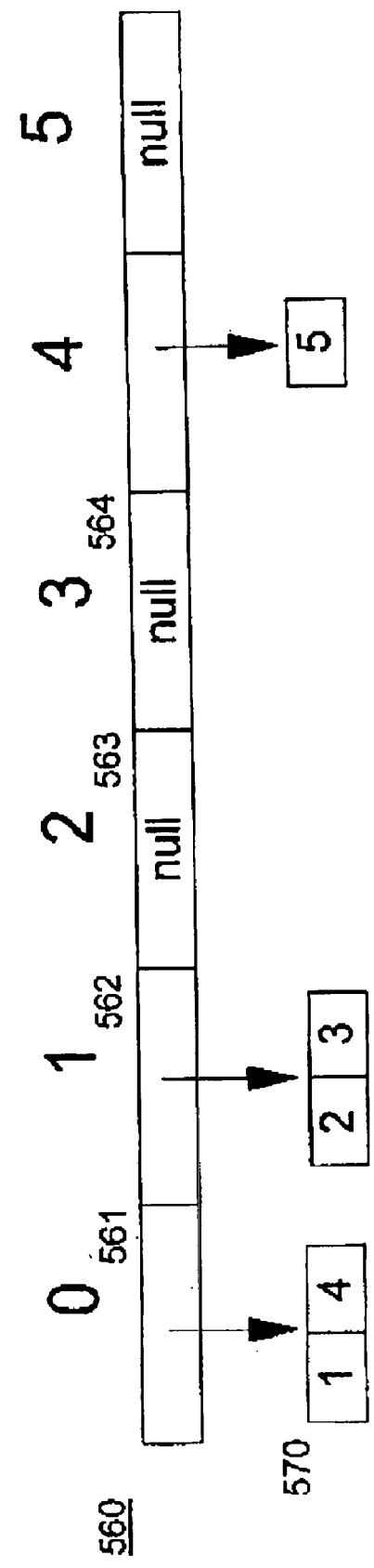

Suppose the desired transformation is deleting an element from a document. The logic shown in the flowchart of FIG. 10B may be used to perform this delete element operation. The process begins by searching through the element name array to locate the element having a particular name (Block 1020). Once the name is located, the corresponding node index is then available. This process has been described above with reference to Blocks 1000 and 1005 of FIG. 10A. The index of this element's parent is then obtained (Block 1025) by using the node index to access the parent array. The parent's index is then used (Block 1030) to access the children list array. The index of the element being deleted is then removed from the list for this parent. With reference to FIG. 5E, for example, to delete the element having the name "level_one_element2", which is shown at 420 in FIG. 4A, this node name is found in the array name entry having index 4. Using index 4 to access the parent array indicates that this element's parent has the index 0 (see 553 of FIG. 5D). Next using index 0 to index the children list array, the index value 4 is deleted from the list at 570.

The deleted element is now not reachable through the children list array. Preferably, the entries in each array for this deleted element are also removed to avoid incorrectly finding references to the element. This process (not shown in FIG. 10B) comprises using the element's index (obtained from the search in Block 1020), and setting the value of the array element having this index to a special value (such as a null value). The element's name, attribute names and attribute values (if any), and any element value may be completely removed from the mXML buffer and data buffer, if desired, by performing a compaction operation which will require recomputing the node indexes and starting locations for the remaining elements.

Figure 10C:
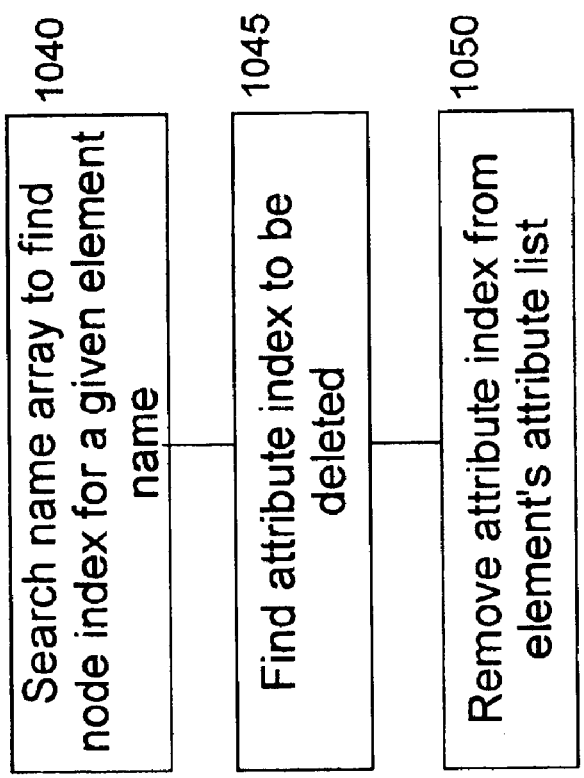
Figure 10B:
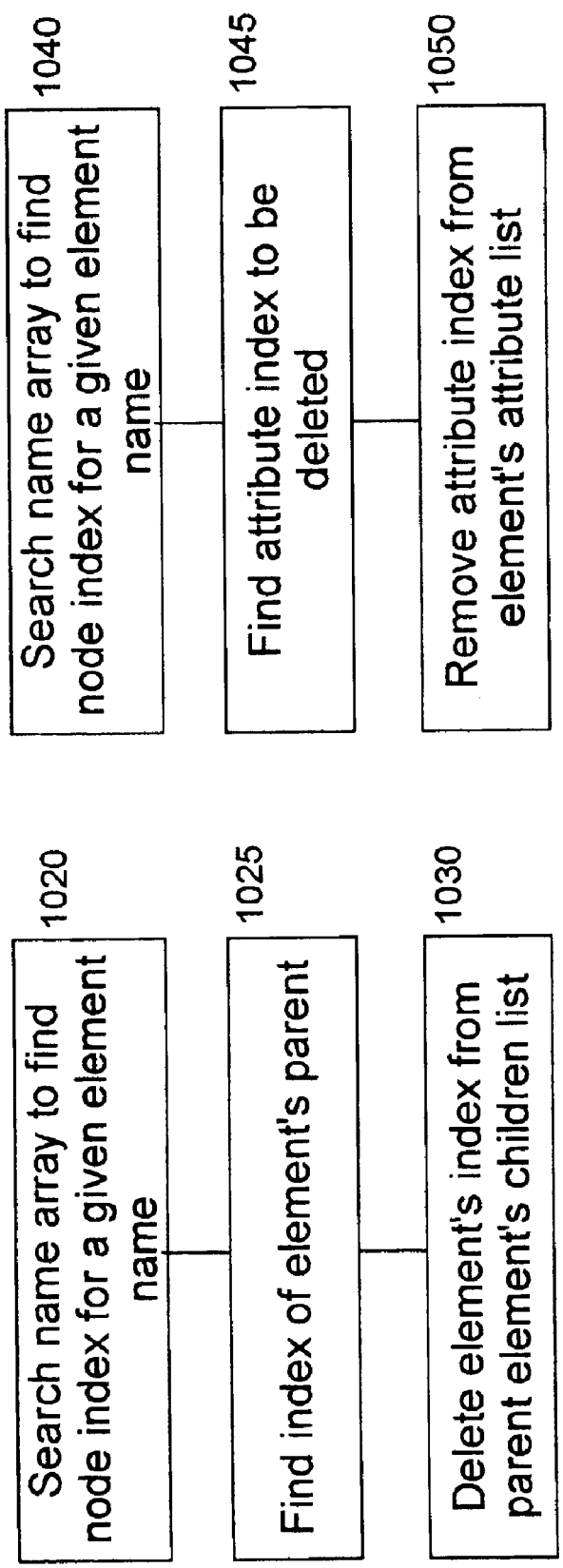

The flowchart in FIG. 10C provides a preferred embodiment of the logic that may be used for deleting an attribute of an element. The process begins by searching through the element name array to locate the element having a particular name (Block 1040), in order to obtain the corresponding node index (as has been described above with reference to Blocks 1000 and 1005 of FIG. 10A). The index of the attribute to be deleted is then obtained (Block 1045). This comprises using the element's node index to access its information in the attribute array, and searching through the elements of this attribute array to locate the attribute having a particular name. (Or, other approaches may be used when applicable. For example, the ordinal of the attribute to be deleted may be known in advance, in which case no search is necessary. Or, it may be desired to delete an attribute having a particular value, in which case the search looks for this value instead of for an attribute name.) Once the attribute index is known, the attribute is deleted (Block 1050) by removing that array element (for example, by removing the array element 536 from the array structure 530). Optionally, a compaction process may be performed as described with reference to FIG. 10B, where in this case the attribute's name and value are removed from the data buffer, the attribute specification is removed from the node specification of the appropriate element, and the indexes and starting positions are recomputed.

Based on the logic shown in FIGS. 10A through and 10C, it will be obvious to one of ordinary skill in the art how other retrieval operations and other simple transformations (such as adding elements, renaming elements, changing attribute values, etc.) can be performed.

As has been demonstrated, the present invention provides an efficient storage format for structured document representation. Studies conducted by the inventors of the present invention show that the processing time can be greatly reduced by using this array-based storage format as an alternative to the DOM tree representations of the prior art, while still conveying equivalent content and semantic information.

This array-based storage structure may be used within a product boundary, enabling (for example) an efficient representation of documents originally encoded in XML, mXML, and other similar notations to be shared among different processing components, transferred from one storage medium to another (such as between memory and disk), and so forth. Methods of conducting e-commerce or e-business applications are also facilitated using the array-based structure of the present invention, as the information in these arrays may be serialized and then efficiently exchanged among business partners, within different locations of an enterprise, etc. Or, these array-based structures may be created upon receiving structured documents in e-commerce or e-business scenarios, where the array-based document representation enables the subsequent processing to be performed more efficiently.

While the preferred embodiment of the present invention has been described, additional variations and modifications in that embodiment may occur to those skilled in the art once they learn of the basic inventive concepts. In particular, the preferred embodiment may be adapted to changes in the XML and/or mXML notation, should they occur, and the inventive concepts disclosed herein may also be adapted for use with other notations that are syntactically similar to XML and mXML. Therefore, it is intended that the appended claims shall be construed to include both the preferred embodiment and all such variations and modifications as fall within the spirit and scope of the invention.

What is claimed:

1. A computer program product embodied on one or more computer-readable media, the computer program product adapted for representing a source document encoded in an extensible structured notation using a plurality of arrays and comprising:

computer-readable program code means for generating an element name array, the element name array comprising an element name entry for each element in the source document, wherein each element name entry specifies a starting name position and one of (1) a name length or (2) an ending name position;

computer-readable program code means for generating an element value array, the element value array comprising an element value entry for each element in the source document, wherein each element value entry specifies a starting value position and one of (1) a value length or (2) an ending value position;

computer-readable program code means for generating a parent array, the parent array comprising a parent entry for each element in the source document and wherein a value of each parent entry identifies a parent of the element;

computer-readable program code means for generating a child array, the child array comprising a child entry for each element in the source document and wherein a value of each child entry identifies zero or more children of the element; and computer-readable program code means for storing the generated arrays in memory or writing the generated arrays to one or more storage media.

2. The computer program product according to claim 1, further comprising:

computer-readable program code means for generating an attribute array, the attribute array comprising an attribute entry for each element in the structured document, wherein each attribute entry specifies a reference to a secondary array and wherein the secondary array comprises a secondary attribute entry for each of one or more attributes of those ones of the elements which have attributes, and a null value otherwise; and wherein each secondary attribute entry specifies a starting name position and one or (1) an ending name position or (2) a length for a name of the attribute, and a starting value position and one or (1) an ending value position or (2) a length for a value of the attribute.

3. The computer program product according to claim 1, wherein the extensible structured notation is XML (Extensible Markup Language).

4. The computer program product according to claim 1, further comprising computer-readable program code means for generating an output structured document from the arrays.

5. A computer program product embodied on one or more computer-readable media, the computer program product adapted for creating a plurality of arrays to represent a source document encoded in a machine-oriented extensible structured notation ("mXML") and comprising:

computer-readable program code means for obtaining a node count from the source document;

computer-readable program code means for generating the arrays based on the node count; and computer-readable program code means for processing a plurality of node specifications from the source document, further comprising:

computer-readable program code means for obtaining an element name specification from the node specification;

computer-readable program code means for storing element name information in an element name army, using the element name specification;

computer-readable program code means for obtaining an attribute list specification from the node specification;

computer-readable program code means for storing attribute information in an attribute array, using the attribute list specification;

computer-readable program code means for obtaining a child list specification from the node specification;

computer-readable program code means for storing child information in a child array, using the child list specification;

computer-readable program code means for storing parent information in a parent array, using the child list specification;

computer-readable program code means for obtaining an element value specification from the node specification; and computer-readable program code means for storing element value information in an element value array, using the element specification.

6. The computer program product according to claim 5, further comprising computer-readable program code means for generating an output mXML document by traversing the plurality of arrays.

7. A computer program product embodied on one or more computer-readable media, the computer program product adapted for transforming a structured document and comprising:

computer-readable program code means for creating an array-based representation of the structured document, further comprising:

computer-readable program code means for creating an element name array to store information pertaining to a name of each of a plurality of elements in the structured document;

computer-readable program code means for creating an element value array to store information pertaining to a value of each of the elements;

computer-readable program code means for creating an attribute array to store information pertaining to a name and a value of each of zero or more attributes of each of the elements;

computer-readable program code means for creating a parent array to store information pertaining to a parent of each of the elements; and computer-readable program code means for creating a child array to store information pertaining to zero or more children of each of the elements;

computer-readable program code means for obtaining an identification of a particular element of the structured document which is to be transformed;

computer-readable program code means for locating an entry for the particular element in the arrays-based representation; and computer-readable program code means for transforming information represented by the located entry.

8. The computer program product according to claim 7, wherein the identification is an element name and wherein the computer-readable program code means for locating further comprises computer-readable program code means for searching the element name array to find a match with the identification.

9. The computer program product according to claim 7, wherein the identification is an ordinal representing a relative position of the particular element in the structured document, and wherein the computer-readable program code means for locating further comprises computer-readable program code means for using the ordinal as an index to access one or more of the arrays in array-based representation.

10. A method for representing a source document encoded in an extensible structured notation using a plurality of arrays, comprising the steps of:

generating an element name array, the element name array comprising an element name entry for each element in the source document, wherein each element name entry specifies a starting name position and one of (1) a name length or (2) an ending name position;

generating an element value array, the element value array comprising an element value entry for each element in the source document, wherein each element value entry specifies a starting value position and one of (1) a value length or (2) an ending value position;

generating a parent array, the parent array comprising a parent entry for each element in the source document and wherein a value of each parent entry identifies a parent of the element;

generating a child array, the child away comprising a child entry for each element in the source document and wherein a value of each child entry identifies zero or more children of the element; and storing the generated arrays in memory or writing the generated arrays to one or more storage media.

11. The method according to claim 10, further comprising the steps of:

generating an attribute array, the attribute array comprising an attribute entry for each element in the structured document, wherein each attribute entry specifies a reference to a secondary array and wherein the secondary array comprises a secondary attribute entry for each of one or more attributes of those ones of the elements which have attributes, and a null value otherwise; and wherein each secondary attribute entry specifies a starting name position and one or (1) an ending name position or (2) a length for a name of the attribute, and a starting value position and one or (1) an ending value position or (2) a length for a value of the attribute.

12. The method according to claim 10, wherein the extensible structured notation is XML (Extensible Markup Language).

13. The method according to claim 10, further comprising the step of generating an output structured document from the arrays.

14. A method for creating a plurality of arrays to represent a source document encoded in a machine-oriented extensible structured notation ("mXML"), comprising the steps of:

obtaining a node count from the source document;

generating the arrays based on the node count; and processing a plurality of node specifications from the source document, further comprising the steps of:

obtaining an element name specification from the node specification;

storing element name information in an element name array, using the element name specification;

obtaining an attribute list specification from the node specification;

storing attribute information in an attribute array, using the attribute list specification;

obtaining a child list specification from the specification;

storing child information in a child array, using the child list specification;

storing parent information in a parent array, using the child list specification;

obtaining an element value specification from the node specification; and storing element value information in an element value array, using the element specification.

15. The method according to claim 14, further comprising the step of generating an output mXML document by traversing the plurality of arrays.

16. A method for transforming a structured document, comprising the steps of:

creating an array-based representation of the structured document, further comprising the steps of:

creating an element name array to store information pertaining to a name of each of a plurality of elements in the structured document;

creating an element value array to store information pertaining to a value of each of the elements;

creating an attribute array to store information pertaining to a name and a value of each of zero or more attributes of each of the elements;

creating a parent array to store information pertaining to a parent of each of the elements; and creating a child array to store information pertaining to zero or more children of each of the elements;

obtaining an identification of a particular element of the structured document which is to be transformed;

locating an entry for the particular element in the arrays-based representation; and transforming information represented by the located entry.

17. The method according to claim 16, wherein the identification is an element name and wherein the locating step further comprises the step of searching the element name array to find a match with the identification.

18. The method according to claim 16, wherein the identification is an ordinal representing a relative position of the particular element in the structured document, and wherein the locating step further comprises the step of using the ordinal as an index to access one or more of the arrays in the array-based representation.

* * * * *